US012759496B2

(12) United States Patent
Dickinson et al.

(10) Patent No.: US 12,759,496 B2
(45) Date of Patent: Oct. 13, 2026

(54) VEHICLE EVENT PREVENTION AND MANAGEMENT

(71) Applicant: Polaris Industries Inc., Medina, MN (US)

(72) Inventors: Owen A. Dickinson, Wyoming, MN (US); Timothy J. Busse, Maple Grove, MN (US); Daniel K. Krings, Roseau, MN (US); Jan R. Vistad, Roseau, MN (US); Aaron D. Deckard, Wyoming, MN (US)

(73) Assignee: POLARIS INDUSTRIES INC., Medina, MN (US)

(*) Notice: Subject to any disclaimer, the term of this patent is extended or adjusted under 35 U.S.C. 154(b) by 0 days.

(21) Appl. No.: 18/943,292

(22) Filed: Nov. 11, 2024

(65) Prior Publication Data

US 2025/0153672 A1 May 15, 2025

Related U.S. Application Data

(60) Provisional application No. 63/598,357, filed on Nov. 13, 2023.

(51) Int. Cl.

*B60R 21/207* (2006.01)
*B60R 21/00* (2006.01)
*B60R 21/231* (2011.01)

(52) U.S. Cl.

CPC ...... *B60R 21/207* (2013.01); *B60R 21/23138* (2013.01); *B60R 2021/0097* (2013.01); *B60R 2021/2074* (2013.01); *B60R 2021/23107* (2013.01); *B60R 2021/23146* (2013.01)

(58) Field of Classification Search

CPC .......... B60R 21/207; B60R 2021/2074; B60R 21/23138; B60R 2021/23107

See application file for complete search history.

(56) References Cited

U.S. PATENT DOCUMENTS

| | | | | |
|---|---|---|---|---|
| 7,150,468 B2 * | 12/2006 | Pan | B60R 21/207 280/730.1 |
| 10,173,629 B2 * | 1/2019 | Barbat | B60N 2/682 |
| 10,315,606 B2 * | 6/2019 | Ohno | B60R 21/207 |

(Continued)

FOREIGN PATENT DOCUMENTS

| | | | |
|---|---|---|---|
| DE | 102014201474 | 7/2015 | |
| EP | 1632407 A2 * | 3/2006 | B60R 21/01552 |

(Continued)

OTHER PUBLICATIONS

"International Application Serial No. PCT US2024 055476, International Search Report mailed Apr. 1, 2025", 4 pgs.

(Continued)

*Primary Examiner* — Faye M Fleming

(74) *Attorney, Agent, or Firm* — SCHWEGMAN LUNDBERG & WOESSNER, P.A.

(57) ABSTRACT

Methods and systems for vehicle event prevention and management are provided. In some examples a seat for a vehicle is provided. The seat includes a backrest, a headrest, and one or more airbags stored within at least one of the backrest or the headrest. The one or more airbags include one or more arm wings, which, when deployed, are sized and shaped to encapsulate at least a portion of one or more arms of an occupant of the seat.

19 Claims, 28 Drawing Sheets

(56) References Cited

U.S. PATENT DOCUMENTS

| | | | | |
|---|---|---|---|---|
| 10,328,889 | B2 * | 6/2019 | Sugie | B60R 21/01552 |
| 10,618,492 | B2 * | 4/2020 | Aranzulla | A42B 3/0486 |
| 10,800,368 | B2 * | 10/2020 | Kitagawa | B60R 21/01552 |
| 10,933,831 | B2 * | 3/2021 | Kim | B60R 21/2338 |
| 11,230,250 | B2 * | 1/2022 | Sturm | B60R 21/2338 |
| 11,718,260 | B2 * | 8/2023 | Ohachi | B60N 2/888 280/730.1 |
| 11,772,593 | B1 * | 10/2023 | Llamazares Domper | B60R 21/207 280/735 |
| 2006/0022441 | A1 | 2/2006 | Hayashi et al. | |
| 2009/0236828 | A1 | 9/2009 | Foubert et al. | |
| 2014/0327234 | A1 * | 11/2014 | Heurlin | B60N 2/2884 280/730.1 |
| 2016/0052477 | A1 * | 2/2016 | Tobata | B60N 2/42 280/730.1 |
| 2018/0236962 | A1 | 8/2018 | Ohno et al. | |
| 2019/0054884 | A1 * | 2/2019 | Dry | B60R 21/2338 |
| 2019/0176744 | A1 | 6/2019 | Yoo et al. | |
| 2019/0248323 | A1 | 8/2019 | Saito et al. | |
| 2020/0114858 | A1 * | 4/2020 | Henriksson | B60R 21/26 |
| 2022/0281404 | A1 | 9/2022 | Nakajima et al. | |
| 2024/0092238 | A1 * | 3/2024 | Lee | B60N 2/0273 |

FOREIGN PATENT DOCUMENTS

| | | | | |
|---|---|---|---|---|
| EP | 1741604 | | 1/2007 | |
| EP | 2799290 | A1 * | 11/2014 | B60N 2/2851 |
| EP | 2799290 | B1 * | 11/2016 | B60N 2/2851 |
| JP | H10272193 | A * | 10/1998 | |
| JP | 2016203945 | | 12/2016 | |
| KR | 20080003201 | A * | 1/2008 | |
| KR | 101510656 | B1 * | 4/2015 | |
| WO | WO-2012044245 | A1 * | 4/2012 | A41D 13/0512 |
| WO | WO-2021002076 | A1 * | 1/2021 | |
| WO | 2021121737 | | 6/2021 | |
| WO | 2025106408 | | 5/2025 | |

OTHER PUBLICATIONS

"International Application Serial No. PCT US2024 055476, Written Opinion mailed Apr. 1, 2025", 13 pgs.

"International Application Serial No. PCT US2024 055476, International Preliminary Report on Patentability mailed May 28, 2026", 15 pgs.

"Mexican Application Serial No. MX a 2026 005884, Response filed Jul. 27, 2026 to Office Action mailed May 20, 2026", With English Machine Translation, 172 pgs.

* cited by examiner

VEHICLE EVENT PREVENTION AND MANAGEMENT

CROSS-REFERENCE TO RELATED APPLICATIONS

The present application claims priority to U.S. Provisional Application No. 63/598,357, filed on Nov. 13, 2023, entitled "VEHICLE EVENT PREVENTION AND MANAGEMENT," the entire disclosure of which is expressly incorporated by reference herein.

BACKGROUND

Certain vehicles, such as off-road vehicles, may include systems and methods for vehicle event prevention and management. For example, certain vehicles may include seatbelts, airbags, handhold bars, and/or other components designed to be used by occupants of a vehicle to help prevent and/or manage vehicle events (e.g., instances where the vehicle is subject to kinematic activity above certain thresholds). There exists a need to improve vehicle event prevention and management. It is with respect to these and other general considerations that embodiments have been described. The embodiments described herein are not to be limited to solving the specific problems identified in the background.

SUMMARY

Aspects of the present disclosure relate to methods and systems for vehicle event prevention and management.

Some embodiments of the present disclosure provide a seat for a vehicle. The seat includes: a backrest, a headrest, and one or more airbags stored within at least one of the backrest or the headrest. The one or more airbags include one or more arm wings, which, when deployed, are sized and shaped to encapsulate at least a portion of one or more arms of an occupant of the seat.

Some embodiments of the present disclosure provide a vehicle. The vehicle includes an operator compartment with a footwell, and a throttle pedal assembly coupled to the footwell. The throttle pedal assembly includes: a pedal pad, an instrumentation section, and a pedal arm extending between the pedal pad and the instrumentation section. The instrumentation section includes a leaf spring and one or more strain gages disposed thereon.

Some embodiments of the present disclosure provide a vehicle. The vehicle includes a seatbelt harness. The seatbelt harness includes a first harness side and a second harness side. The first harness side includes an upper strap, a lower strap, and a connector. The second harness side includes an upper strap, a lower strap, and a connector. The connector of the second harness side is configured to engage with the connector of the first harness side to fasten the seatbelt harness. At least one of the upper straps include a handhold strap that is coupled thereto.

Some embodiments of the present disclosure provide a vehicle. The vehicle includes a seatbelt harness. The seatbelt harness includes a first harness side and a second harness side. The first harness side includes an upper strap, a lower strap, and a connector. The second harness side include an upper strap, a lower strap, and a connector. The connector of the second harness side is configured to engage with the connector of the first harness side to fasten the seatbelt harness. At least one of the upper straps includes a latch mount coupled thereto via a tether extending between the latch mount and the at least one of the upper straps.

Some embodiments of the present disclosure provide a vehicle. The vehicle includes a seatbelt harness. The seatbelt harness includes a first harness side and a second harness side. The first harness side includes an upper strap, a lower strap, and a connector. The second harness side include an upper strap, a lower strap, and a connector. The connector of the second harness side is configured to engage with the connector of the first harness side to fasten the seatbelt harness. The seatbelt harness further includes a shoulder strap coupled to at least one of the upper straps.

Some embodiments of the present disclosure provide a vehicle. The vehicle includes a plurality of ground engaging members, a frame coupled to the plurality of ground engaging members, a rotating arm coupled to the frame, above the plurality of ground engaging members, and a net attached to the underside of the rotating arm.

Some embodiments of the present disclosure provide a vehicle. The vehicle includes a plurality of ground engaging members, a frame coupled to the plurality of ground engaging members, a webbing coupled to the frame, and a retractor for the webbing, coupled to the frame. The retractor includes a housing, and a spool for the webbing, disposed within the housing.

Some embodiments of the present disclosure provide a method for deploying a webbing of a vehicle. The vehicle includes a frame and a retractor, and the webbing includes an upper webbing fixedly coupled to the frame and a lower webbing fixedly coupled to the retractor. The method includes receiving a signal corresponding to a kinematic measurement of the vehicle, activating the retractor, in response to receiving the signal, and retracting the lower webbing of the webbing, via the retractor, thereby expanding the webbing across at least a portion of the frame of the vehicle.

Some embodiments of the present disclosure provide a vehicle. The vehicle includes a frame, a plurality of ground engaging members coupled to the frame, one or more roll angle sensors, one or more indicators, and a controller in communication with the one or more roll angle sensors. The controller includes a processor and memory storing instructions that, when executed by the processor, cause the controller to perform a set of operations. The set of operations include: receiving a signal from the one or more roll angle sensors indicative of a roll angle of the vehicle, and adapting the one or more indicators to provide a notification that corresponds to the roll angle, based on the signal.

Some embodiments of the present disclosure provide a vehicle. The vehicle includes a frame, a plurality of ground engaging members coupled to the frame, an image sensor, one or more kinematic sensors, and a controller in communication with the image sensors and the one or more kinematic sensors. The controller includes a processor and memory storing instructions that, when executed by the processor, cause the controller to perform a set of operations. The set of operations include: receiving one or more signals from the one or more kinematic sensors, determining that a vehicle event has occurred based on the one or more signals, and activating the image sensor.

Some embodiments of the present disclosure provide a method of deploying one or more occupant retention devices. The method includes: receiving a setting for a kinematic tolerance of a vehicle, receiving an indication corresponding to one or more kinematics of the vehicle, comparing the indication to the kinematic tolerance, and deploying the one or more occupant retention devices, in response to determining that the kinematic tolerance is exceeded.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
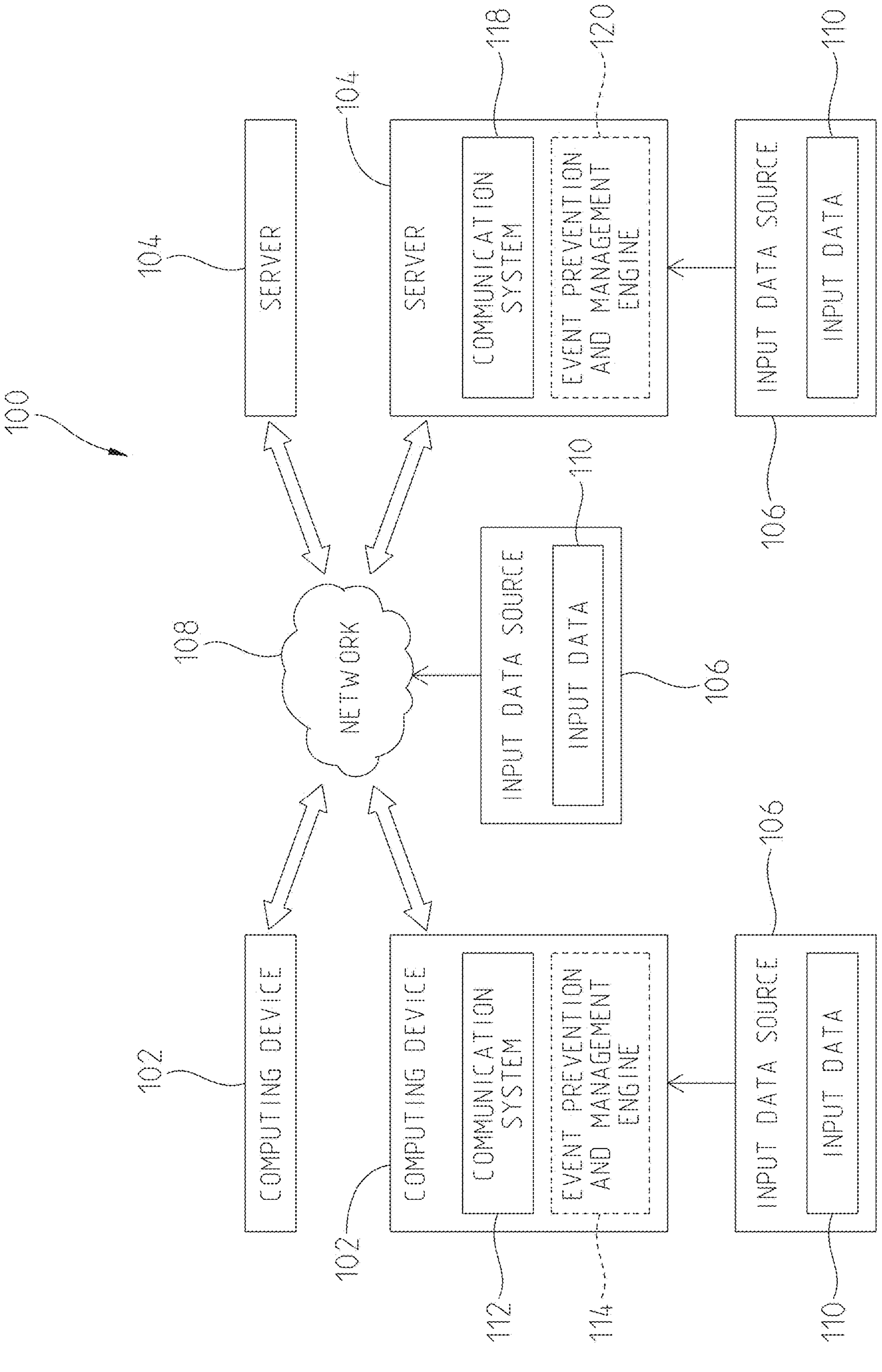
FIG. 1 illustrates an overview of an example system according to some aspects described herein.

FIG. 1 shows an example of a system 100, in accordance with some aspects of the disclosed subject matter. The system 100 may be a system for vehicle event prevention and management. The system 100 includes one or more computing devices 102, one or more servers 104, one or more input data sources 106, and a communication network or network 108. In some examples, the computing device 102 can receive input data 110 from the input data source 106. Additionally, or alternatively, in some examples, the network 108 can receive input data 110 from the input data source 106. In some examples, the computing device 102 may be similar or identical to controllers described later herein (e.g., controller 322 of FIG. 3, controller 630 of FIG. 6, controller 2020 of FIG. 20) and/or intermediary communication devices to with which controllers described herein may interface.

In some examples, the computing device 102 is a controller. The controller 102 may include a processor and memory storing instructions configured to implement one or more methods or processes disclosed herein. The controller 102 may be configured or otherwise programmed to control operation of an engine (e.g., for a fuel-powered vehicle or a hybrid vehicle) and/or an electric motor (e.g., for a hybrid vehicle or an electric drivetrain vehicle). In some examples, the controller 102 is configured or otherwise programmed to control operation of a battery (e.g., for a fuel-powered vehicle and/or for an electric drivetrain vehicle). Accordingly, in some examples, the computing device 102 may be included in a vehicle (e.g., vehicle 200). Additionally, or alternatively, in some examples, the computing device 102 may be a nomadic device, such as a smartphone, tablet, wearable device, etc., as may be associated with a rider of the vehicle.

In some examples, computing device 102 includes a communication system 112 and/or an event prevention and management engine 114. In some embodiments, computing device 102 can execute at least a portion of the event prevention and management engine 114 to implement one or more features described herein. For example, when at least a portion of the event prevention and management engine 114 is executed, one or more airbags may be deployed, a vehicle setting may be adjusted (e.g., throttle level, power on/off, speed delimiting, etc.), one or more nets may be deployed, one or more vehicle roll indications may be generated, one or more image sensors may be activated, and/or one or more other features may be implemented, as will be recognized by those of ordinary skill in the art, at least in light of teachings provided herein.

In some examples, server 104 includes a communication system 118 and/or event prevention and management engine 120. In some embodiments, server 104 can execute at least a portion of the event prevention and management engine 120 to implement one or more features described herein. For example, when at least a portion of the event prevention and management engine 120 is executed, one or more airbags may be deployed, a vehicle setting may be adjusted (e.g., throttle level, power on/off, speed delimiting, etc.), one or more nets may be deployed, one or more vehicle roll indications may be generated, one or more image sensors may be activated, and/or one or more other features may be implemented, as will be recognized by those of ordinary skill in the art, at least in light of teachings provided herein.

Additionally, or alternatively, in some examples, computing device 102 can communicate data received from input data source 106 to server 104 over communication network 108, which can execute at least a portion of the event prevention and management engine 114, 120. In some examples, the event prevention and management engine 114, 120 executes one or more portions of methods/processes disclosed herein and/or recognized by those of ordinary skill in the art, in light of the present disclosure.

In some examples, computing device 102 and/or server 104 can be any suitable computing device or combination of devices, such as a desktop computer, a vehicle computer, a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing device 102 and/or a plurality of servers 104.

In some examples, input data source 106 can be any suitable source of input data (e.g., data generated from a computing device, data stored in a repository, data generated from a software application, data received from a vehicle, etc.) In some examples, input source 106 can include memory storing input data (e.g., local memory of computing device 102, local memory of server 104, cloud storage, portable memory connected to computing device 102, portable memory connected to server 104, etc.). In some examples, input data source 106 can include an application configured to generate input data and provide the input data via a software interface. In some examples, input data source 106 can be local to computing device 102. In some examples, input data source 106 can be remote from computing device 102, and can communicate input data 110 to computing device 102 (and/or server 104) via a communication network (e.g., communication network 108). In some examples, the input data source 106 may include multiple sources of input data.

In some examples, the input data 110 may include vehicle information retrievable from a vehicle controller, sensors of a vehicle (e.g., seatbelt sensor, door sensor, seat sensor, etc.), and/or components of a vehicle (e.g., engine, battery, etc.). In some examples, the input data 110 may include data retrievable from one or more kinematic sensors, such as that are associated with vehicle 200 (e.g., accelerometer, velocity sensor, gyroscope, angular velocity sensor, etc.) In some examples, input data 110 may include data retrievable from a remote and/or local data store (e.g., of server 104 or computing device 102, respectively).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth or Bluetooth Low Energy network), a cellular network (e.g., a 3G network, a 4G network, a 5G network, etc., complying with any suitable standard), a wired network, a Controller Area Network (CAN), etc. In some examples, communication network 108 can be a local area network (LAN), interfaces conforming known communications standard, such as Bluetooth® standard, IEEE 802 standards (e.g., IEEE 802.11), a ZigBee® or similar specification, such as those based on the IEEE 802.15.4 standard, a wide area network (WAN), a public network (e.g., the Internet), a private or semi-private network (e.g., a corporate or university intranet), any other suitable type of network, or any suitable combination of networks. In some examples, communication links (arrows) shown in FIG. 1 can each be any suitable communications link or combination of communication links, such as wired links, fiber optics links, Wi-Fi links, Bluetooth® links, cellular links, satellite links, etc.

Figure 2:
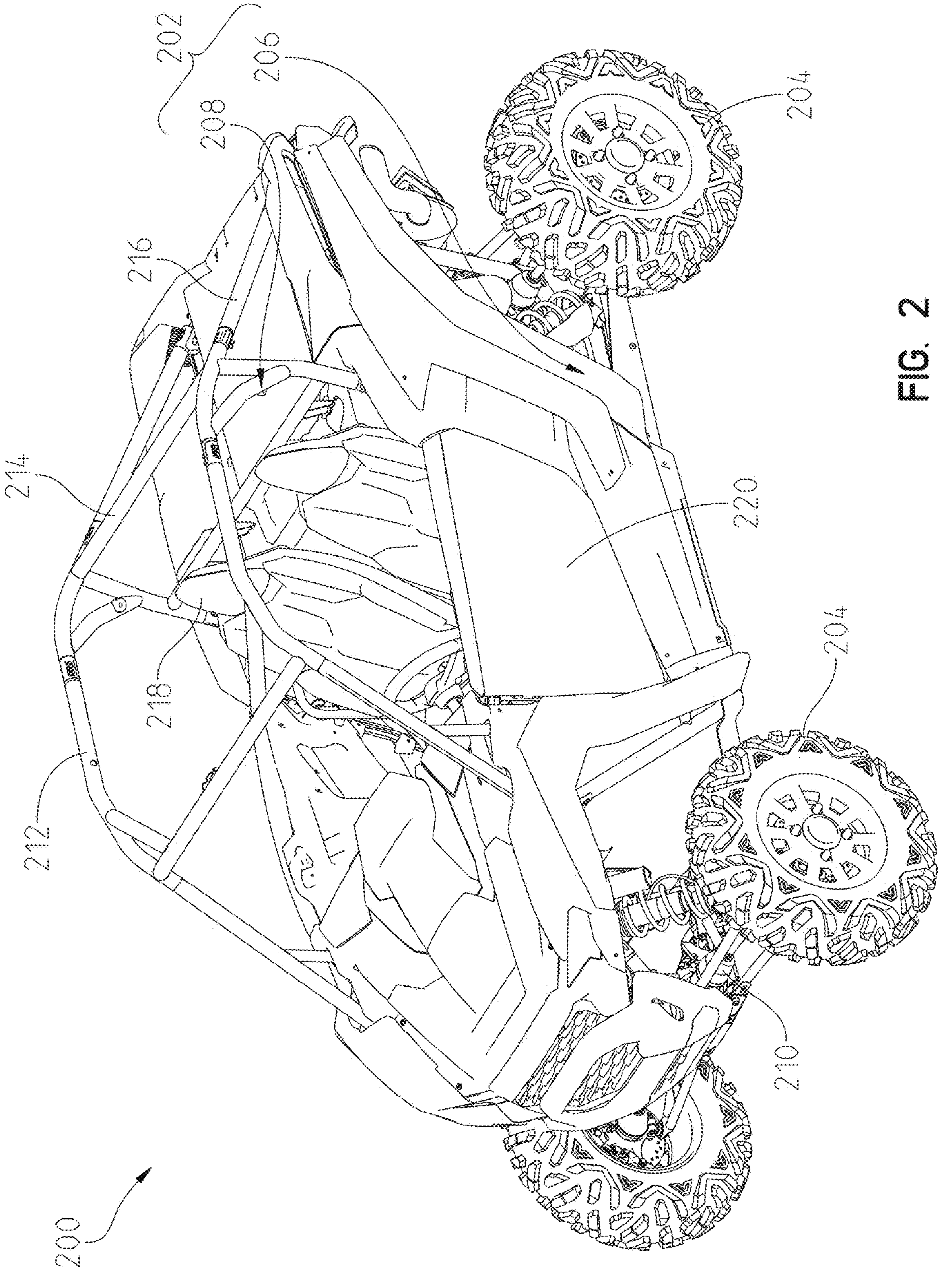
FIG. 2 illustrates an example vehicle, according to some aspects provided herein.

FIG. 2 illustrates an example vehicle 200, according to some aspects provided herein. The vehicle 200 is merely an example and those of ordinary skill in the art will recognize other types of vehicles to which teachings of the present disclosure may be applied. For example, types of vehicles that may incorporate mechanisms to prevent and manage vehicle events, as provided herein, may include: an all-terrain vehicle (ATV), a utility vehicle (UTV), an on-road vehicle, an off-road vehicle, a motorcycle, a snowmobile, a moped, a pontoon boat, a jet ski, a speedboat, or another type of vehicle that may be recognized by those of ordinary skill in the art.

The vehicle 200 includes a frame 202 and one or more ground engaging members 204 (e.g., wheels and tires). The frame 202 includes a lower frame 206 and an upper frame 208. The one or more ground engaging members 204 are operably coupled to the lower frame 206 while the upper frame 208 may extend generally over the operator area of vehicle 200. The vehicle 200 further includes a drivetrain 210 operably coupled to the lower frame 206 and drivingly connected to one or more of the ground engaging members 204. The upper frame 208 includes a front section 212, a center section 214, and a rear section 216. The front, center, and rear sections 212, 214, 216 may couple to each other and to the lower frame 206.

In examples, the drivetrain 210 is comprised of a fuel-burning engine and transmission combination, together with a driveshaft extending between the drivetrain and two of the ground engaging members 214. As another example, the drivetrain 210 could be a hybrid, fuel cell, or electric drivetrain, among other examples. The drivetrain 210, related front and rear suspension assemblies, and steering assemblies are more thoroughly described in our application Ser. No. 17/223,717, filed Apr. 6, 2021, Ser. No. 11/494,891 filed Jul. 28, 2006, and Ser. No. 11/494,890, filed Jul. 28, 2006, the subject matter of which is incorporated herein by reference.

The vehicle 200 further includes one or more seats 218. In some examples, the frame 202 defines an operator compartment, in which an operator sits on at least one of the one or more seats 218. The one or more seats 218 may be a plurality of seats, such as side-by-side seats. In the illustrated example of FIG. 2, the one or more seats 218 are bucket seats. The one or more seats may be similar to the seat 310 of FIG. 3. In some examples, the one or more seats 218 include a seat harness or seatbelt, such as the seatbelt 800, 900, and/or 1000, discussed later herein with respect to FIGS. 8, 9, and 10.

The vehicle 200 may include a footwell (not shown) into where feet of occupants of the vehicle 200 extend. For example, the footwell may be located within the operator compartment defined by the frame 202. The footwell may include one or more operator inputs, for example pedals, such as a gas pedal, a brake pedal, and or a clutch pedal. One or more occupants sitting in the seats 218 may have feet that extend into the footwell of the vehicle 200. The footwell may be similar to the footwell 602, discussed later herein with respect to FIG. 6.

Figure 3:
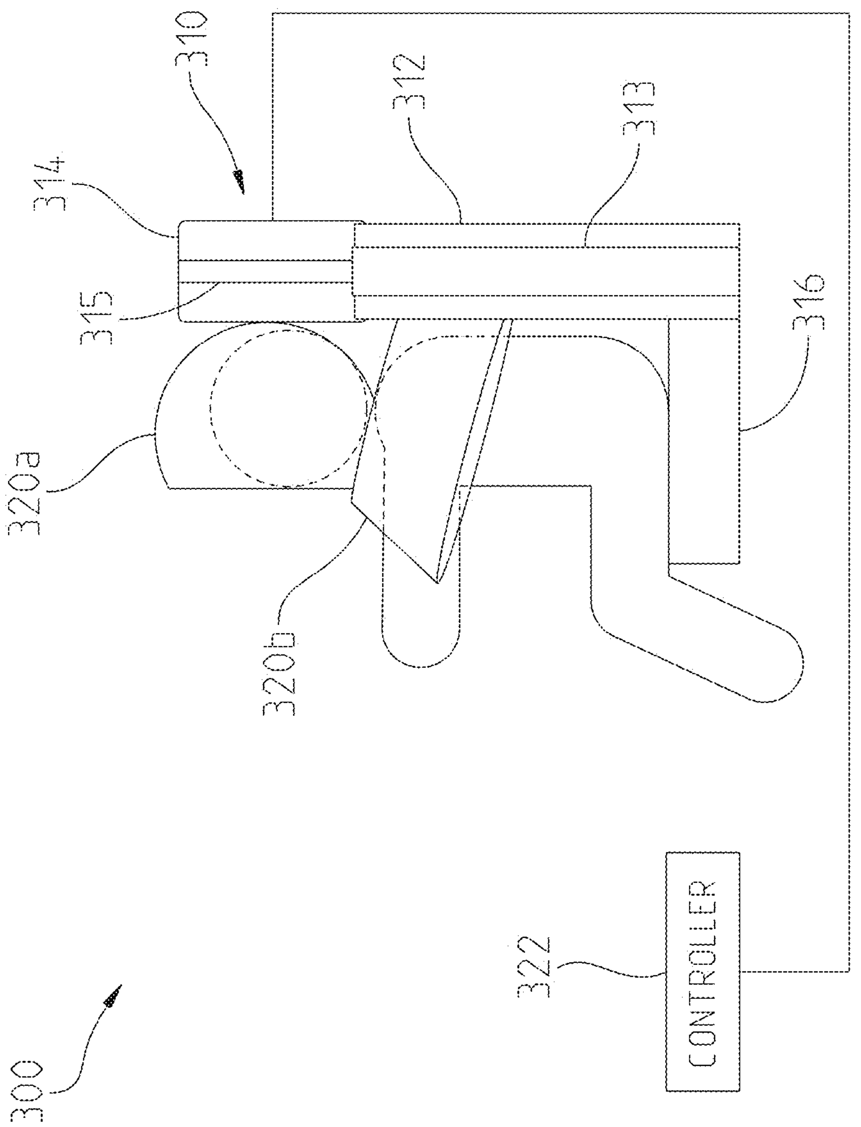
FIG. 3 illustrates an example system, according to some aspects described herein.
Figure 6:
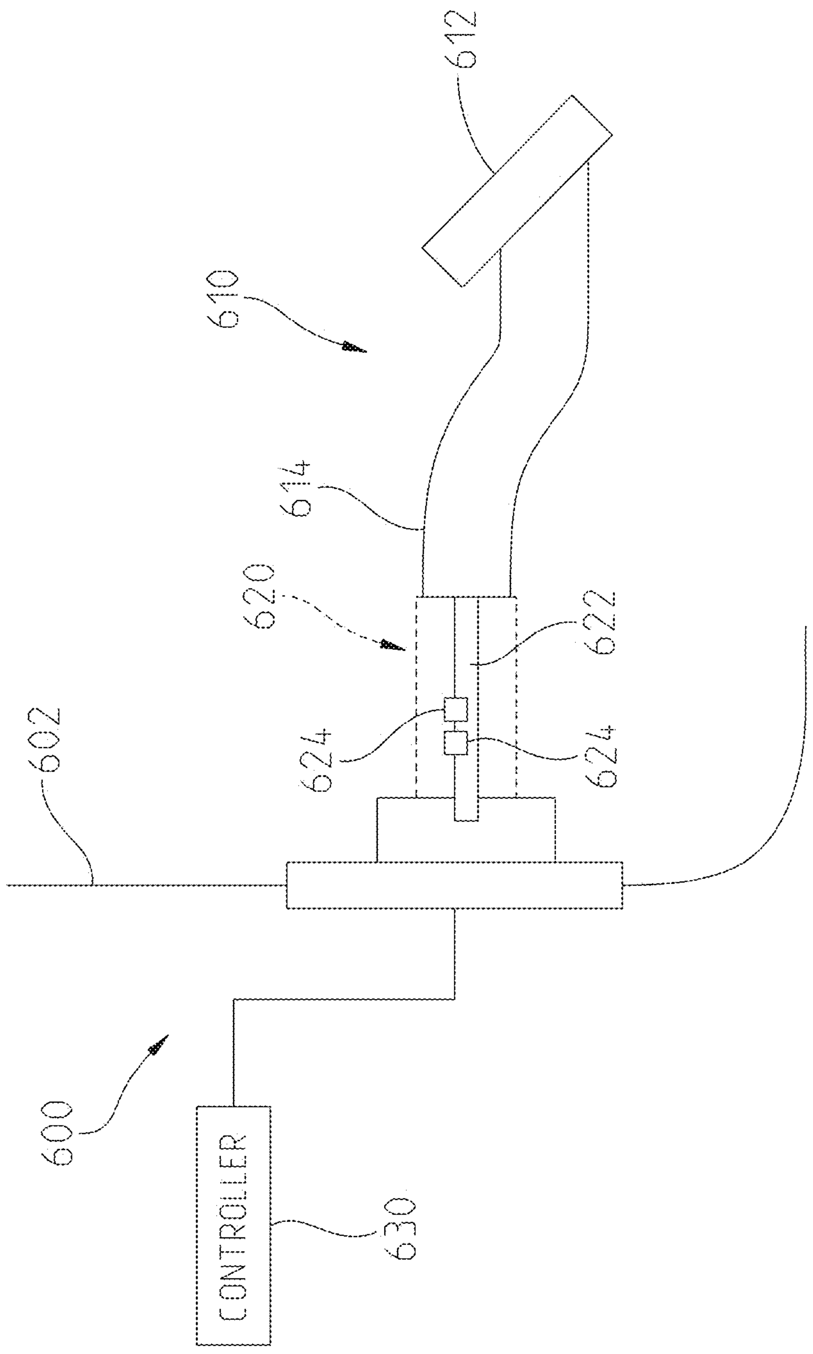
FIG. 6 illustrates an example system, according to some aspects described herein.
Figure 20:
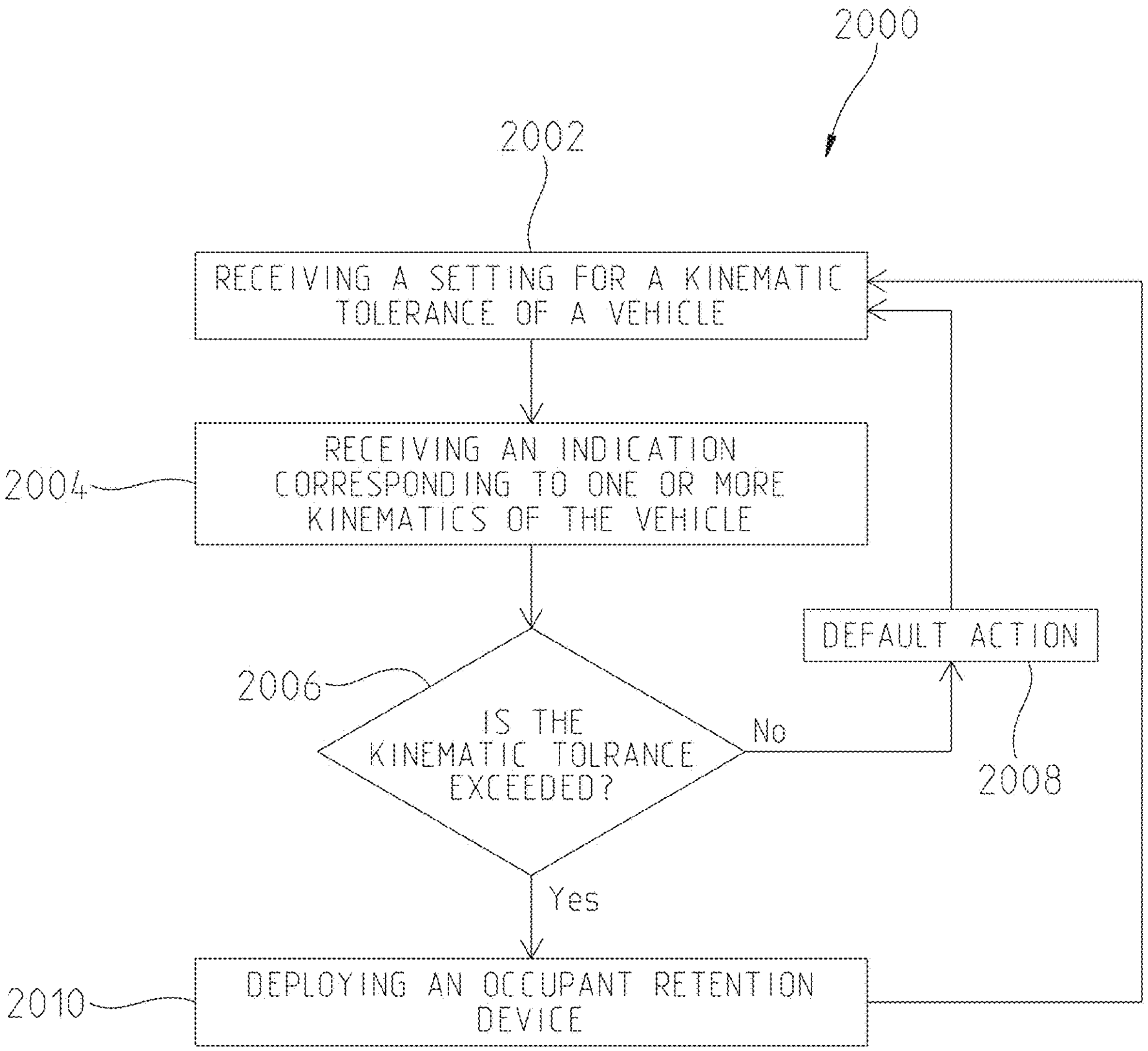
FIG. 20 illustrates an example method for deploying one or more occupant retention devices, according to some aspects described herein.

The drivetrain 210 may be in communication with a controller, such as the controller 102 discussed earlier herein with respect to FIG. 1, controller 322 of FIG. 3, controller 630 of FIG. 6, and/or controller 2020 of FIG. 20. The controller may control the drivetrain 210, such as to control speed and/or acceleration of the vehicle 200. In some examples, the controller controls a battery and/or engine of the vehicle 200. In some examples, the vehicle 200 includes climate control settings, light/visibility settings, audio/entertainment settings, seat position settings, and/or suspension settings which are controlled by the controller and/or another computing device included in the vehicle 200.

The vehicle 200 further includes doors 220, which may be half doors or full doors. In some examples, the vehicle 200 does not include doors 220. For example, in some instances, the vehicle 200 includes a rotating arm and/or a net, instead of the doors 220. Such an example of a vehicle with a rotating arm and net, instead of the doors 220, is illustrated via the rotating arm 1110 and the net 1112 of FIGS. 11A and 11B.

Additional and/or alternative components that may be part of the vehicle 200 will be recognized by those of ordinary skill in the art, at least in light of teachings provided herein. Further, components of other types of vehicles that may incorporate mechanisms provided herein (e.g., ATVs, UTVs, on-road vehicles, off-road vehicles, motorcycles, snowmobiles, mopeds, and/or watercraft) will be recognized by those of ordinary skill in the art.

Figure 4:
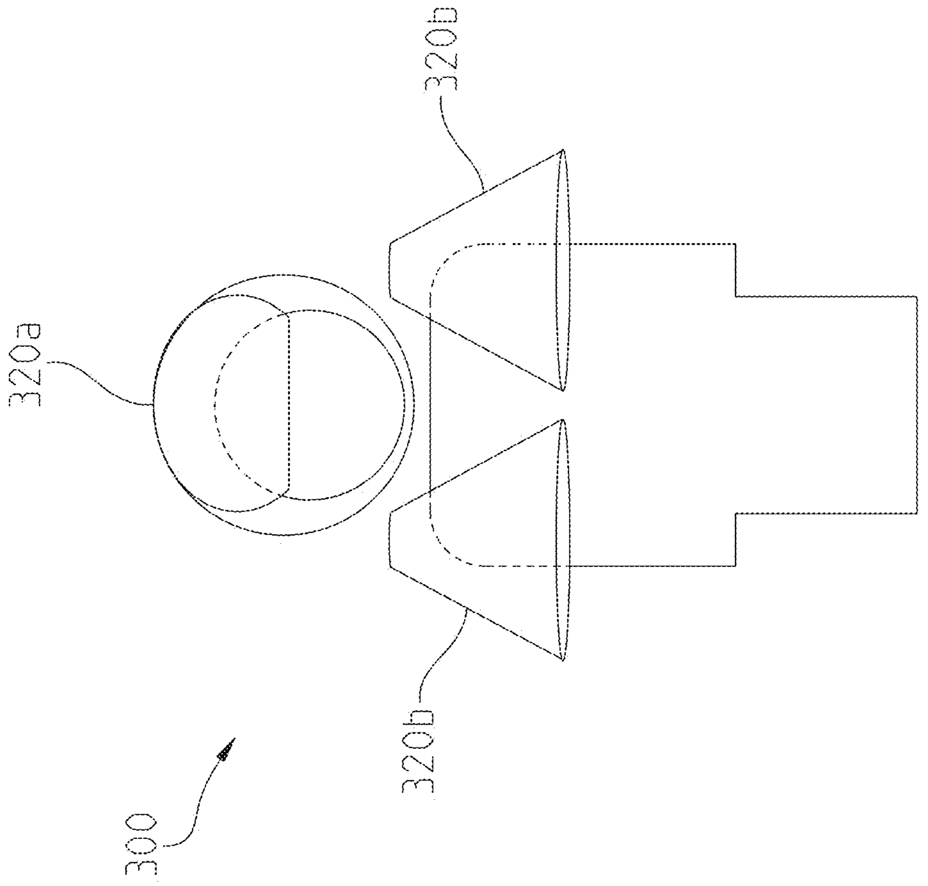
FIG. 4 illustrates an example system, according to some aspects described herein.

FIGS. 3 and 4 illustrate an example system 300, according to some aspects described herein. The example system 300 includes a seat 310. The seat 310 may be similar or the same as the seat 218 discussed earlier herein with respect to FIG. 2. The seat 310 includes a backrest 312, a headrest 314, a seat bottom 316, and one or more airbags 320 stored within at least one of the backrest 312 or the headrest 314. For example, the seat 310 may include one or more airbags 320 stored within the backrest 312 and/or the headrest 314. When considering implementation of one or more airbags, a vehicle manufacturer will need to evaluate multiple factors and apply engineering judgment to assess, among other things, a benefit to occupants. These may include but are not limited to the possible effects to occupants who are not using other aspects of the occupant retention system or are not wearing a helmet.

The one or more airbags 320 may include a helmet airbag 320*a* and/or one or more arm wings 320*b*. The one or more arm wings 320*b*, when deployed, are sized and shaped to encapsulate at least a portion of one or more arms of an occupant of the seat 310. For example, the one or more arm wings 320*b* may extend about one or more shoulders of an occupant of the seat 310 and/or about the deltoids and/or biceps of an occupant of the seat 310. The one or more arm wings 320*b* may extend outward from the seatback 312 and across the seat bottom 316.

In some examples, the one or more arm wings 320*b* are generally conical when deployed. For example, a shape of the one or more arm wings 320*b* may be generally defined by a major diameter and a minor diameter. The minor diameter may extend substantially parallel to and above the major diameter, with respect to the seat bottom 316. In other words, a surface defined by the minor diameter, and which generally defines at least a portion of the conical shape of the one or more arm wings 320*b*, may be substantially parallel to and above a surface defined by the major diameter, which also generally defines at least a portion of the conical shape of the one or more arm wings 320*b*. In some examples, the one or more arm wings 320*b* may be a singular airbag. Additionally, or alternatively, in some examples, the one or more arm wings 320*b* may be a plurality of airbags, which together cooperate to protect an occupant of the seat 310. In some examples, the one or more arm wings 320*b* extend entirely about a front of the torso of the occupant (e.g., uniformly and continuously across the seat back 312). In some examples, the one or more arm wings 320*b* extend across portions of the torso of the occupant, but not entirely across the torso of the occupant. In these ways, arm wings 320*b* may be configured to prevent arms of the occupant from extending above a lower surface of the one or more arm wings 320*b* when deployed, such as below an upper boundary of door 220.

In some examples, the backrest 312 includes a frame 313. Further, in some examples, the headrest 314 includes a frame 315. The one or more airbags 320 may be stored within the backrest frame 313 and/or within the headrest frame 315. Accordingly, in some examples, the one or more airbags 320 may be stored within at least one of the frames 313, 315 (e.g., of the backrest and/or the headrest).

The helmet airbag 320*a*, when deployed, is sized and shaped to encapsulate a head of an occupant of the seat 310, such as a helmet of the occupant of seat 310. In some examples, the helmet airbag 320*a* is sized to generally surround and at least partially encapsulate the head of an average-sized male in the United States, according to height, weight, and head circumference guidelines available in the United States. In some examples, the helmet airbag 320*a* is generally spherical, when deployed. The helmet airbag 320*a* may be large enough to encapsulate a helmet being worn on the head of the occupant of the seat 310. In some examples, the helmet airbag 320*a* includes an opening on a side of the helmet airbag 320*a* (when deployed) that is furthest from the headrest 314.

In some examples, the one or more airbags 320 and/or a deployment mechanism (not shown) configured to deploy the one or more airbags 320 may be in communication with a controller 322. The controller 322 may be similar or the same as the computing device 102 discussed earlier herein with respect to FIG. 1. In some examples, the controller 322 may perform one or more methods/processes to deploy the one or more airbags 320, such as the example method 500 discussed below. In some examples, controller 322 may be configured to arm the one or more air bags 320 based on a detected proximity of the helmet of an occupant to seat 310. Systems and methods of controlling vehicle systems, such as an airbag system, are described in U.S. Provisional Patent Application No. 63/469,590, filed on May 30, 2023, entitled "ENHANCING SAFETY OF A VEHICLE," which is incorporated by reference in its entirety.

Figure 5:
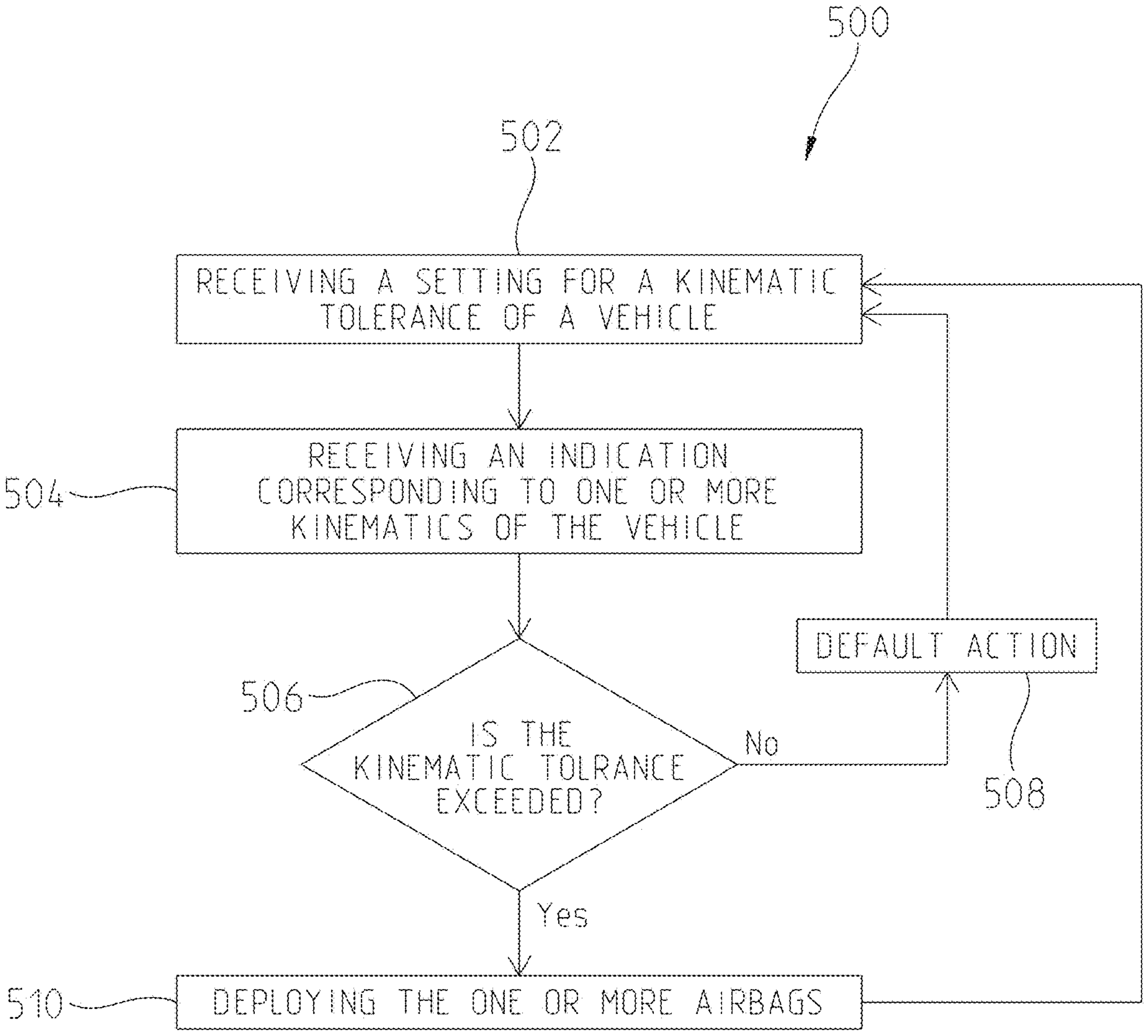
FIG. 5 illustrates an example method for deploying one or more airbags, according to some aspects described herein.

FIG. 5 illustrates an example method according to some aspects described herein. The example method 500 may be a method for deploying one or more airbags 320 and/or other airbags associated with the vehicles disclosed herein. In examples, aspects of method 500 are performed by a device, such as controller 322, computing device 102, and/or server 102, discussed earlier herein with respect to FIGS. 1 and 3.

Method 500 begins at operation 502, wherein a setting is received for a kinematic tolerance of a vehicle (e.g., vehicle 200). The setting may correspond to an acceleration tolerance, an angular velocity tolerance, a velocity tolerance, a pitch tolerance, and/or another kinematic tolerance of the vehicle that may be recognized by those of ordinary skill in the art.

At operation 504, an indication is received that corresponds to one or more kinematics of the vehicle. The indication may be received from one or more sensors of the vehicle, such as an accelerometer, a gyroscope, an inertial measurement unit (IMU), and/or another sensor used to measure and/or derive kinematic values that may be recognized by those of ordinary skill in the art. The sensor from which the indication is received may be a vehicle sensor, an accessory sensor (e.g., of a jacket, collar, wearable accessory, etc.), a nomadic device sensor, and/or another intermediary computing device that may be recognized by those of ordinary skill in the art. Accordingly, the indication may correspond to an acceleration of the vehicle, a velocity of the vehicle, a pitch of the vehicle, an angular velocity of the vehicle, an angular acceleration of the vehicle, and/or another kinematic factor that may be recognized by those of ordinary skill in the art.

At operation 506, it is determined if the kinematic tolerance is exceeded (e.g., in a positive direction, or a negative direction, such as by increasing above the kinematic tolerance, or decreasing below the kinematic tolerance). For example, the indication received at operation 504 may be compared to the kinematic tolerance setting received at operation 502 to determine whether the kinematic tolerance is exceeded. In some examples, the kinematic tolerance may correspond to a single type of kinematic value (e.g., solely acceleration, solely velocity, etc.). In some examples, the kinematic tolerance may correspond to a plurality of kinematic values (e.g., a function in which two or more types of kinematic values are weighted together). For example, the kinematic tolerance may correspond to a first weighted amount of an acceleration value and a second weighted amount of an angular velocity value. Additional and/or alternative combinations of kinematic values will be recognized by those of ordinary skill in the art, at least in light of teachings provided herein.

If the kinematic tolerance is not exceeded, as indicated by "NO" in FIG. 5, method 500 proceeds to operation 508, where a default action is performed. For example, the indication corresponding to one or more kinematics of the vehicle may include a pre-configured action that is performed at operation 508. Additionally, or alternatively, the default action may include storing one or more settings, storing the received indication, etc. In some examples, method 500 may comprise determining whether the indication has an associated default action, such that, in some instances, no action may be performed as a result of receiving the indication. Method 500 may terminate at operation 508. Alternatively, method 500 may return to operation 502 to provide an iterative loop of receiving a setting for a kinematic tolerance of a vehicle, receiving an indication corresponding to one or more kinematics of the vehicle, and determining if the kinematic tolerance is exceeded.

However, if it is determined that the kinematic tolerance is exceeded, as indicated by "YES" in FIG. 5, method 500 advances to operation 510. At operation 510, one or more airbags (e.g., airbags 320 of FIGS. 3 and 4) may be deployed. For example, the helmet airbag **320*a* may be deployed. Additionally, or alternatively, one or more of the one or more arm wings 320*b* may be deployed. Generally, when an airbag is deployed, it is pressurized with air to exit whatever storage unit it is held within (e.g., the frame 315, the frame 313, the headrest 314, the backrest 312**, etc.) and expand outward therefrom.

Method 500 may terminate at operation 510. Alternatively, method 500 may return to operation 502 (or any other operation from method 500) to provide an iterative loop, such as of determining whether one or more airbags should be deployed in response to one or more kinematic tolerances being exceeded, and then deploying the one or more airbags, if appropriate.

FIG. 6 illustrates an example system 600 according to some aspects described herein. The example system includes a footwell 602. The footwell 602 may be the footwell of an operator compartment, such as of the operator compartment defined by the frame 202 of the vehicle 200 discussed with respect to FIG. 2. Accordingly, the vehicle 200 may include an operator compartment with the footwell 602.

The example system 600 further includes a throttle pedal assembly 610. The throttle pedal assembly 610 is coupled to the footwell 602. The throttle pedal assembly 610 includes a pedal pad 612, a pedal arm 614, and an instrumentation section 620. The pedal arm 614 extends between the pedal pad 612 and the instrumentation section 620. For example, the pedal arm 614 may be a lever that is curved and/or extends straight between the pedal pad 612 and the instrumentation section 620.

The instrumentation section 620 includes a leaf spring 622 and one or more strain gauges 624 disposed thereon. The leaf spring 622 may be relatively thinner than the pedal arm 614. The leaf spring 622 may be fixedly coupled to the footwell 602 at a first end and coupled to the pedal arm 614 at a second end such that the first end and the second end of the leaf spring 622 are laterally opposed.

In some examples, the instrumentation section 620 is encapsulated in an elastomeric material. For example, the elastomeric material may include at least one of silicone or epoxy. In some examples, the leaf spring 622 includes an elastic metal. For example, the leaf spring 622 may include steel. In some examples, the pedal pad 612 and/or the pedal arm 614 may include metal, plastic, and/or wood. Additional and/or alternative materials that may be used to manufacture the pedal pad 612 and/or the pedal arm 614 will be recognized by those of ordinary skill in the art.

In some examples, the throttle pedal assembly 610 is in communication with a controller 630. For example, a vehicle (e.g., vehicle 200 of FIG. 2) in which the throttle pedal assembly 610 is installed may include the controller 630. In some examples, the one or more strain gauges 624 are in communication with the controller 630, such that measurements from the strain gages 624 are received by the controller 630. In some examples, the one or more strain gages 624 are in wired communication with the controller 630. In some examples, the one or more strain gages 624 are in wireless communication with the controller 630, such as via an intermediary communication device to which the strain gages 624 are coupled, and with which the controller 630 is in wireless communication.

In some examples, the throttle pedal assembly 610 may be installed into a vehicle (e.g., vehicle 200) at the time of manufacture. Additionally, or alternatively, the throttle pedal assembly 610 may be retrofitted into a vehicle after the vehicle has already been manufactured. For example, the throttle pedal assembly 610 may be coupled to wires (e.g., in communication with the controller 630) that were previously coupled to a different throttle pedal assembly.

Receiving throttle input via the throttle pedal assembly 610 may be relatively more accurate and easier to maintain than conventional throttle pedal assemblies. For example, conventional throttle pedal assemblies may incur dust, dirt, or other debris in moving components that are tiresome to clean. However, the throttle pedal assembly 610 is fixedly coupled to the footwell 602 and the electronic components (e.g., the strain gages 624) are housed in an elastomer. Therefore, the throttle pedal assembly 610 is relatively easy to maintain and provides relatively more accurate throttle measurements than existing throttle pedal assemblies.

In some examples, the throttle pedal assembly 610 is calibrated at a time of manufacture, such that readings from the strain gages 624 are mapped to specific throttle values, when the pedal pad 612 is deflected from a rest position. In some examples, the throttle pedal assembly 610 may be re-calibrated and/or fine-tuned at a regular and/or irregular time interval (e.g., annually).

Figure 7:
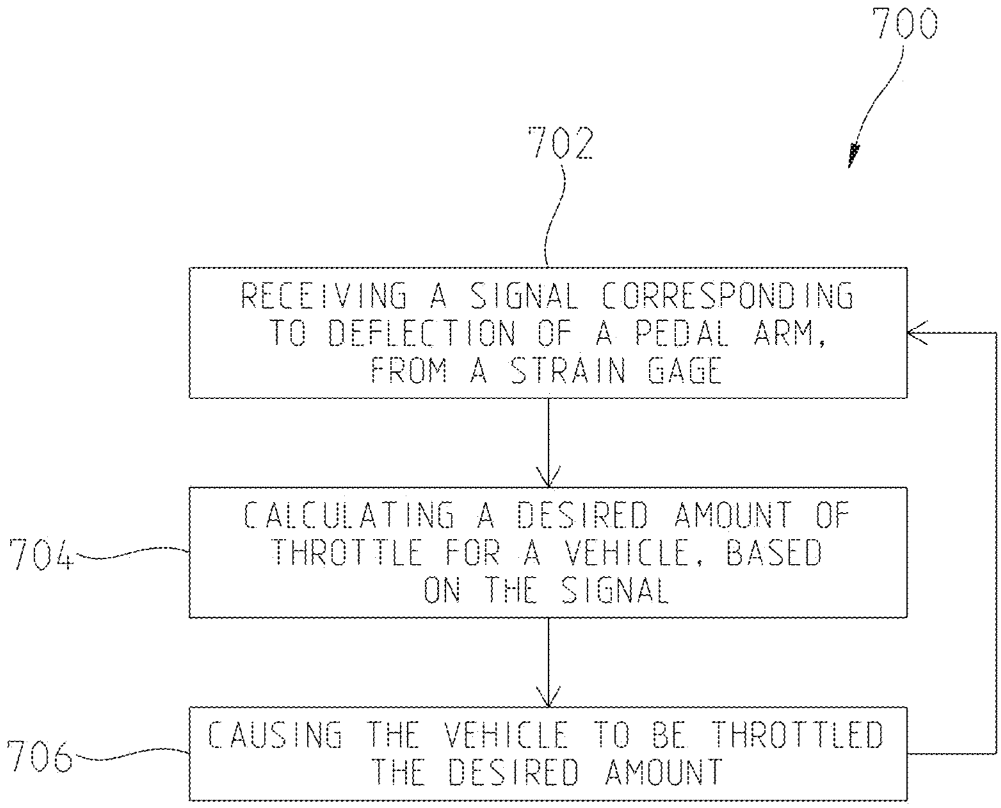
FIG. 7 illustrates an example method of controlling vehicle throttle, according to some aspects described herein.

FIG. 7 illustrates an example method 700, according to some aspects described herein. The example method 700 may be a method of controlling vehicle throttle using a pedal assembly, such as the throttle pedal assembly 610 described with respect to FIG. 6. In examples, aspects of method 700 are performed by a device, such as computing device 102, and/or server 104, discussed with respect to FIG. 1. Additionally, or alternatively, aspects of method 700 are performed by the controller 630 discussed above with respect to FIG. 6.

Method 700 begins at operation 702, wherein a signal is received that corresponds to deflection of a pedal arm (e.g., pedal arm 614). The signal may be received from a strain gage (e.g., the one or more strain gages 624).

At operation 704, a desired amount of throttle is calculated for a vehicle (e.g., vehicle 200), based on the signal. For example, the signal may be pre-mapped or calibrated to throttle values, such that a certain degree of voltage corresponds to a certain amount of throttle. In some examples, the mapping from the signal to a throttle value is according to a linear function. In some examples, the mapping from the signal to a throttle value is according to a non-linear function. In some examples, the mapping from the signal to a throttle value is set by a manufacturer. In some examples, the mapping from the signal to a throttle value is customizable by a vehicle owner (e.g., via their own calibrations, or by bringing the vehicle in to an authorized service provider).

At operation 706, the vehicle is caused to be throttled the desired amount. For example, if an operator of the vehicle pushes down on the pedal arm (e.g., or a pedal pad connected to the pedal arm) a first amount, then the vehicle may be caused to be throttled a corresponding first amount. If an operator of the vehicle pushes down on the pedal arm a second amount, then the vehicle may be caused to be throttled to a corresponding second amount. In some examples, the vehicle is throttled via a controller. Additionally, or alternatively, in some examples, the vehicle is throttled by one or more other devices which are in communication with a device at which method 700 is being performed, thereby allowing the device at which method 700 is being performed to cause the vehicle to be throttled, indirectly.

Method 700 may terminate at operation 706. Alternatively, method 700 may return to operation 702 (or any other operation from method 700) to provide an iterative loop, such as of receiving a signal corresponding to deflection of a pedal arm, from a strain gage, calculating a desired amount of throttle for a vehicle, based on the signal, and causing the vehicle to be throttled the desired amount.

Figure 8:
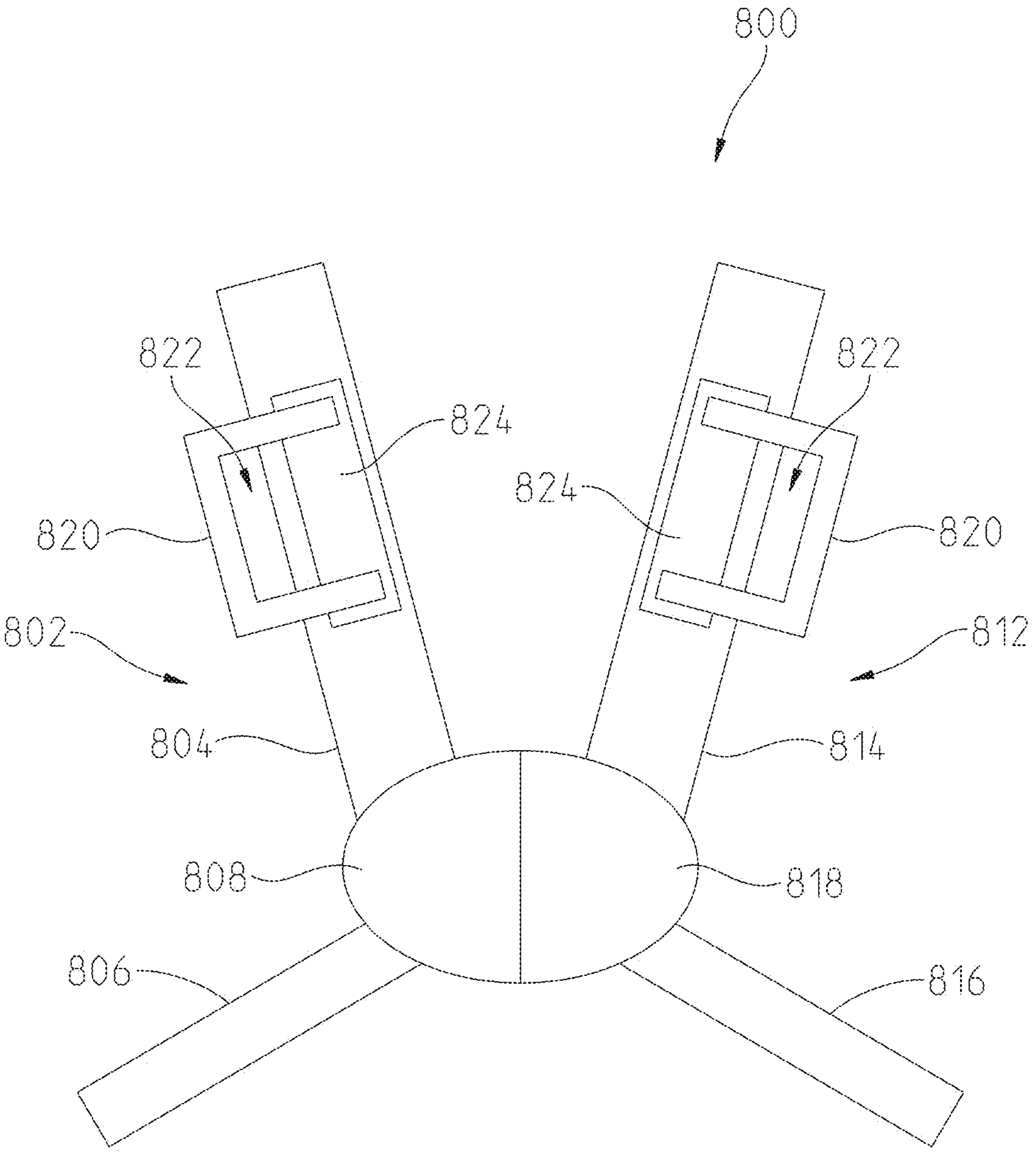
FIG. 8 illustrates an example seatbelt, according to some aspects described herein.

FIG. 8 illustrates an example seatbelt 800 according to some aspects described herein. The example seatbelt 800 is a four-point seatbelt harness. However, it should be recognized by those of ordinary skill in the art that teachings provided herein are applicable to other types of seatbelts, such as three-point seatbelts, five-point seatbelts, etc., and therefore should not be limited to only the illustrated seatbelt harness. The seatbelt 800 may be part of a vehicle, such as the vehicle 200 described earlier herein with respect to FIG. 2.

The seatbelt harness 800 includes a first harness side 802 that includes an upper strap 804, a lower strap 806, and a connector 808. The seatbelt harness 800 further includes a second harness side 812 that includes an upper strap 814, a lower strap 816, and a connector 818. The connector 818 of the second harness side 810 is configured to engage with the connector 808 of the first harness side 802 to fasten the seatbelt 800. In some examples the connectors 808, 818 include a clip, a buckle, a button, and/or another type of coupling mechanism that may be recognized by those of ordinary skill in the art. Further, in some examples, the seatbelt 800 may include one or more components discussed herein with respect to seatbelts 900 and/or 1000 of FIGS. 9 and 10, respectively.

At least one of the upper straps 804, 814 includes a handhold strap 820 coupled thereto. In some examples, the upper strap 804 of the first harness side 802 and the upper strap 814 of the second harness side 812 each include a respective handhold strap 820 coupled thereto. In some examples, the handhold straps 820 are coupled to the upper strap 804 and/or 814 via sewing. For example, the upper straps 804, 814 may be made of a fabric, such as nylon, and the handhold straps 820 may also be made of a fabric, such as nylon, so that the handhold straps 820 can be sewn to the upper strap 804 and/or 814. In some examples, the handhold straps 820 are otherwise coupled to the upper strap 804 and/or 814, such as via adhesive, hook and loop fasteners, or magnetic couplings.

In some examples, the handhold straps 820 define a channel 822 with the at least one of the upper straps 804 and/or 814. The channel 822 is sized and shaped to receive a hand of a user of the seatbelt harness 800. In some examples, the upper straps 804 and/or 814 include a stiffening member 824 at where the handhold strap 820 is coupled to the upper strap 804 and/or 814. The stiffening member 824 may be one or more layers of material disposed on the upper strap 804 and/or 814 at where the handhold strap 820 is coupled. For example, the stiffening member 824 may include nylon, or plastic, or another type of polymer that may be recognized by those of ordinary skill in the art to provide enhanced rigidity and/or stability to the seatbelt harness 800 at where the handhold straps 820 are located.

In some examples, the handhold straps 820 may be located at about half a distance along the upper straps 804 and/or 814, as measured from a first end of the upper straps 804 and/or 814 at the connectors 808/818 to a second end of the upper straps 804 and/or 814 located at a seat (or other vehicle component) to which the seatbelt harness 800 is attached. In some examples, the handhold straps 820 may be located relatively closer to the first end of the upper straps 804 and/or 814 than to the second end of the upper straps 804 and/or 814.

In some examples, the handhold 820 straps extend from a top of the upper straps 804 and/or 814 (e.g., the top being opposite to a surface of the backrest along which the upper straps 804 and/or 814 extend). In some examples, the handhold straps 820 extend from a side of the upper straps 804 and/or 814 (e.g., such that the handhold straps 820 extend generally parallel along a surface of the backrest along which the upper straps 804 and/or 814 extend).

Figure 9:
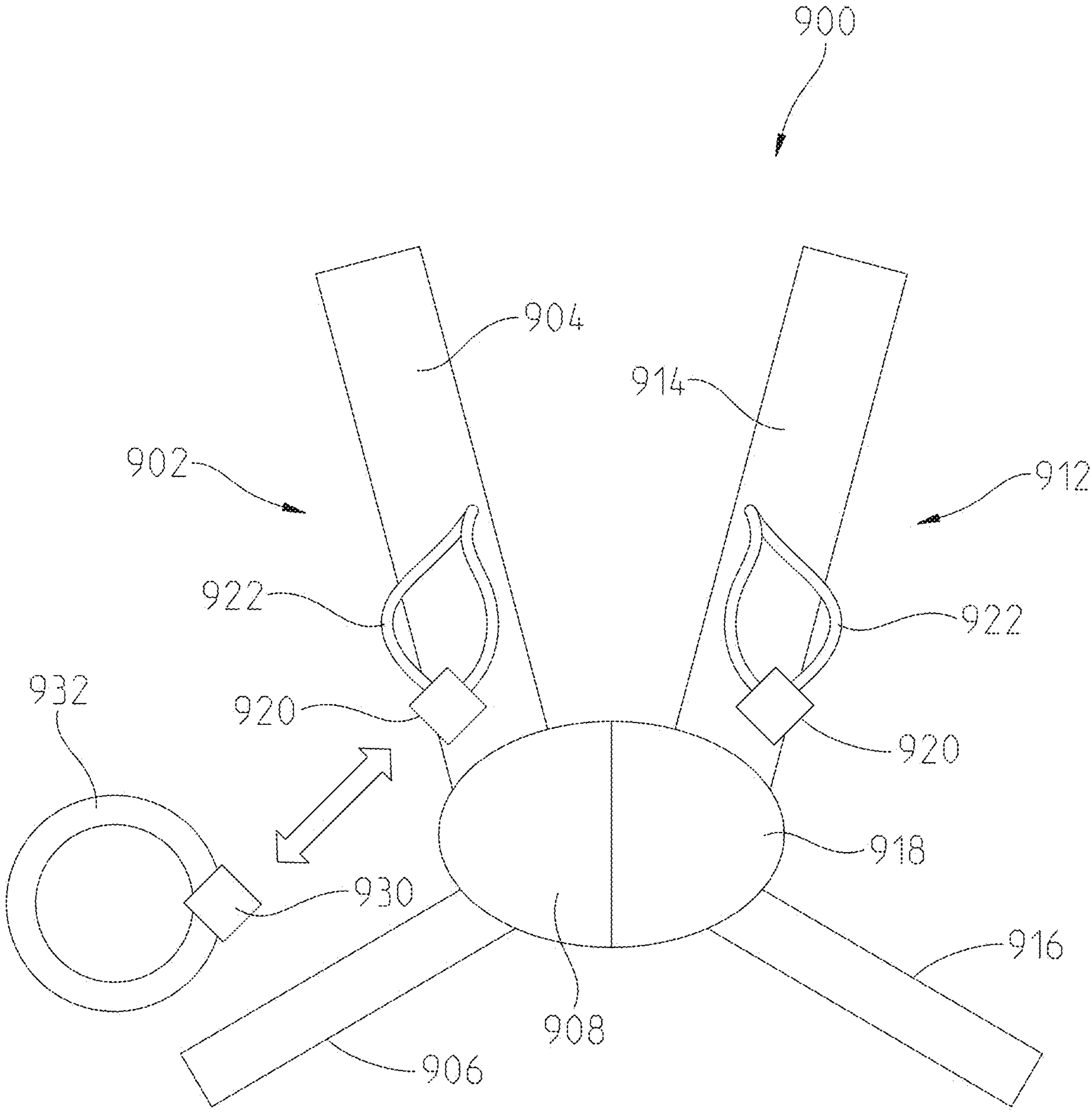
FIG. 9 illustrates an example seatbelt, according to some aspects described herein.

FIG. 9 illustrates an example seatbelt 900 according to some aspects described herein. The example seatbelt 900 is a seatbelt harness. However, it should be recognized by those of ordinary skill in the art that teachings provided herein are applicable to other types of seatbelts, such as three-point seatbelts, four-point seatbelts, five-point seatbelts, etc., and therefore should not be limited to only seatbelt harnesses. The seatbelt 900 may be part of a vehicle, such as the vehicle 200 described earlier herein with respect to FIG. 2.

The seatbelt harness 900 includes a first harness side 902 that includes an upper strap 904, a lower strap 906, and a connector 908. The seatbelt harness 900 further includes a second harness side 912 that includes an upper strap 914, a lower strap 916, and a connector 918. The connector 918 of the second harness side 910 is configured to engage with the connector 908 of the first harness side 902 to fasten the seatbelt 900. In some examples the connectors 908, 918 include a clip, a buckle, a button, and/or another type of coupling mechanism that may be recognized by those of ordinary skill in the art. Further, in some examples, the seatbelt 900 may include one or more components discussed herein with respect to seatbelts 800 and/or 1000 of FIGS. 8 and 10, respectively.

At least one of the upper straps 904, 914 includes a latch mount 920 coupled thereto. For example, the latch mount 920 may be coupled to the upper strap 904 and/or 914 via a tether 922 that extends between the latch mount 920 and the at least one of the upper straps 904, 914. In some examples, the upper strap 904 of the first harness side 902 and the upper strap 914 of the second harness side 912 each include a respective latch mount 920 coupled thereto (e.g., via a respective tether 922).

In some examples, the latch mounts 920 may be coupled to the upper straps 904 and/or 914 at about half a distance along the upper straps 904 and/or 914, as measured from a first end of the upper straps 904 and/or 914 at the connectors 908/918 to a second end of the upper straps 904 and/or 914 located at a seat (or other vehicle component) to which the seatbelt harness 900 is attached. In some examples, the latch mounts 920 may be coupled to the upper straps 904 and/or 914 relatively closer to the first end of the upper straps 904 and/or 914 than to the second end of the upper straps 904 and/or 914.

In some examples, the latch mounts 920 are coupled to a top of the upper straps 904 and/or 914 (e.g., the top being opposite to a surface of the backrest along which the upper straps 904 and/or 914 extend). In some examples, the latch mounts 920 are coupled to a side of the upper straps 904 and/or 914 (e.g., such that the tethers 922 extend generally parallel along a surface of the backrest along which the upper straps 904 and/or 914 extend).

In some examples, the latch mount 920 is a magnetic-mechanical latch mount. For example, the latch mount 920 may include a magnet that helps to position a corresponding latch attachment 930 into a center of the latch mount 920 such the latch attachment 930 may be mechanically pushed into place. In some examples, the latch mount 920 is sized and shaped to receive the corresponding latch attachment 930. The latch attachment 930 may be coupled to or otherwise part of a cuff or bracelet 932. The cuff 932 may be worn by an occupant of the vehicle in which the seatbelt 900 is located.

In some examples, the latch mount 920 is configured, adapted, or otherwise designed to lock the latch attachment 930 thereto when the latch attachment 930 is pressed against the latch mount 920. In some examples, the latch mount 920 is configured to unlock the latch attachment 930 therefrom when the latch attachment 930 is again pressed against the latch mount 920. The attachment/detachment functionality of the latch mount 920 highlights the mechanical aspect of the latch mount 920.

In some examples, the cuff 932 may include functionality to improve a wearer of the cuffs experience while using the cuff 932. For example, the cuff 932 may include a key for the vehicle. As another example, the cuff 932 may include a watch, such that the wearer of the cuff 932 can be informed of a date/time while wearing the cuff 932. In some examples, the cuff 932 may monitor biometric data from the wearer, with the wearer's permission, such as hear rate, calories burned, skin temperature, etc. In some examples, the cuff 932 may track a speed of the wearer, an acceleration of the wearer, a location of a wearer, and/or a distance traveled by the wearer. Such data collected by the cuff 932 may be transmitted to and/or aggregated by a system, such as the system 100 described earlier herein with respect to FIG. 1.

Generally, a person may place one or more cuffs 932 onto one or more of their wrists. The person may enter the vehicle and secure themselves into the seat, via the seatbelt 900. The person, who is now an occupant of the vehicle, may then tap the one or more cuffs 932 (which are around their wrists) onto the location of the seatbelt 900 where the latch mount 920 is located, thereby connecting their wrists (via the cuffs 932) to the seatbelt 900 (e.g., via the tethers 922). Once the person would like to exit the vehicle, they can again tap their cuffs 932 onto the latch mount 920 to disconnect their wrists from the tethers 922. The person may then unsecure the seatbelt 900 and exit the vehicle (e.g., with or without the cuffs 932 still on their wrist, depending on if the person wants to keep it on, or take it off).

Figure 10:
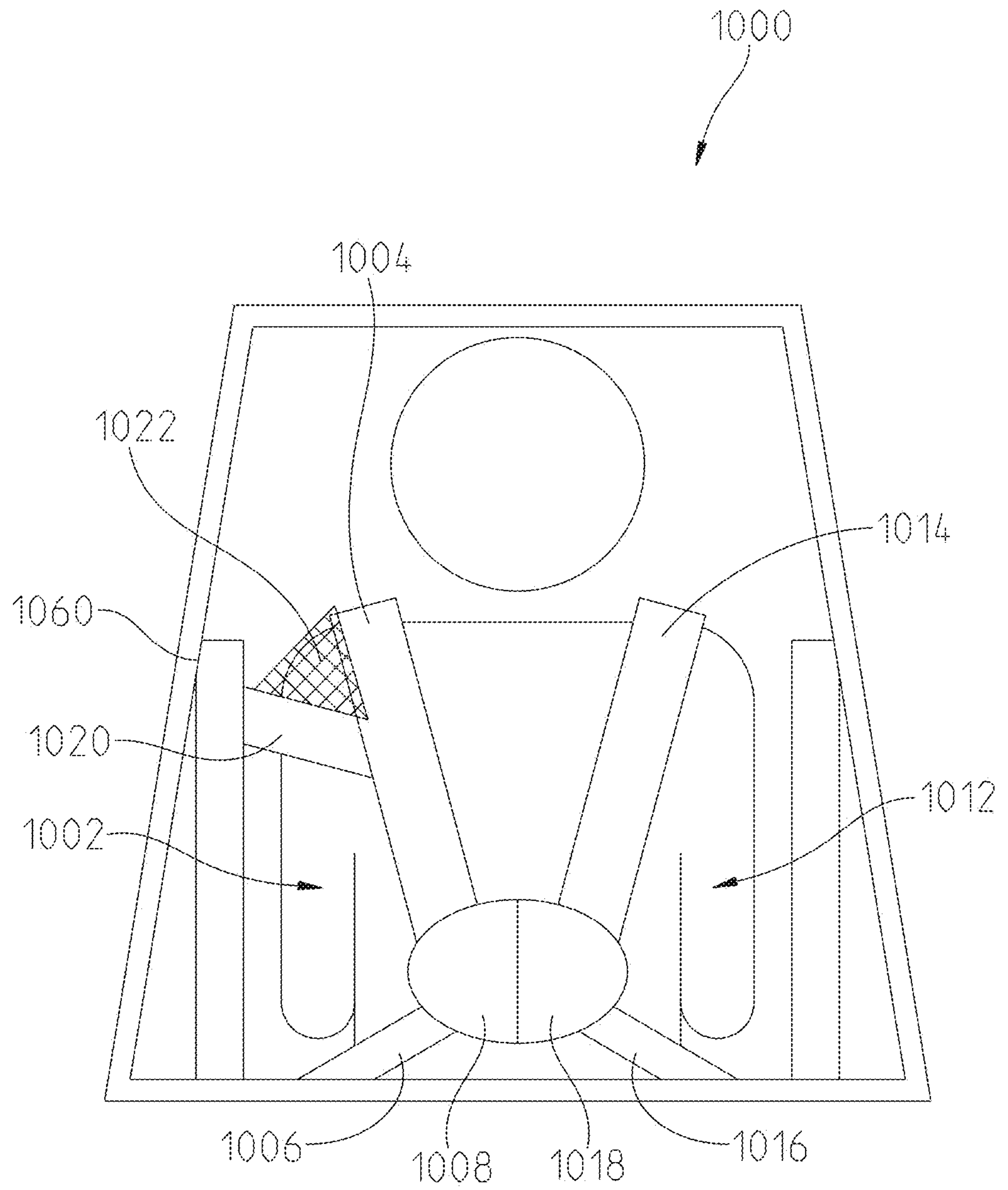
FIG. 10 illustrates an example seatbelt, according to some aspects described herein.

FIG. 10 illustrates an example seatbelt 1000 according to some aspects described herein. The example seatbelt 1000 is a four-point seatbelt harness. However, it should be recognized by those of ordinary skill in the art that teachings provided herein are applicable to other types of seatbelts, such as three-point seatbelts, five-point seatbelts, etc., and therefore should not be limited to only the illustrated seatbelt harness. The seatbelt 1000 may be part of a vehicle, such as the vehicle 200 described earlier herein with respect to FIG. 2.

The seatbelt harness 1000 includes a first harness side 1002 that includes an upper strap 1004, a lower strap 1006, and a connector 1008. The seatbelt harness 1000 further includes a second harness side 1012 that includes an upper strap 1014, a lower strap 1016, and a connector 1018. The connector 1018 of the second harness side 1010 is configured to engage with the connector 1008 of the first harness side 1002 to fasten the seatbelt 1000. In some examples the connectors 1008, 1018 include a clip, a buckle, a button, and/or another type of coupling mechanism that may be recognized by those of ordinary skill in the art. Further, in some examples, the seatbelt 1000 may include one or more components discussed herein with respect to seatbelts 800 and/or 900 of FIGS. 8 and 9, respectively.

The seatbelt 1000 further includes a shoulder strap 1020 coupled to at least one of the upper straps 1004 and/or 1014. The shoulder strap 1020 may extend from the at least one of the upper straps 1004 and/or 1014 at an acute angle with respect thereto. For example, the shoulder strap 1020 may extend from the upper strap 1004 at an angle of about 10 degrees, or about 20 degrees, or about 30 degrees, or another acute angle recognized by those of ordinary skill in the art.

At least one of the upper straps 1004, 1014 includes a shoulder strap 1020 coupled thereto. In some examples, the upper strap 1004 of the first harness side 1002 and the upper strap 1014 of the second harness side 1012 each include a respective shoulder strap 1020 coupled thereto. In some examples, the shoulder straps 1020 are coupled to the upper strap 1004 and/or 1014 via sewing. For example, the upper straps 1014, 1004 may be made of a fabric, such as nylon, and the shoulder straps 1020 may also be made of a fabric, such as nylon, so that the shoulder straps 1020 can be sewn to the upper strap 1004 and/or 1014. In some examples, the shoulder straps 1020 are otherwise coupled to the upper strap 1004 and/or 1014, such as via adhesive, hook and loop fasteners, ties, magnetic couplings, or another type of connector recognized by those of ordinary skill in the art.

In some examples, the seatbelt 1000 is part of a vehicle 1050. The vehicle 1050 may be similar to the vehicle 200 described earlier herein with respect to FIG. 2. In addition to the seatbelt 1000, the vehicle 1050 may include a frame 1060 (e.g., similar to the frame 202 of FIG. 2 and/or the frames 313 or 314 of FIG. 3). The shoulder strap 1020 may be further coupled to the frame 1060, such that the shoulder strap 1020 extends between the at least one of the upper straps 1004, 1014 and the frame 1060. In some examples, the vehicle 1050 may further include one or more seats (e.g., similar to the seats 218 of FIG. 2 or the seat 310 of FIG. 3). Additionally, or alternatively, to being coupled to the frame 1060, the shoulder strap 1020 may be coupled to the seat, such that the shoulder strap 1020 extends between the at least one of the upper straps 1004, 1014 and the seat.

In some examples, the shoulder strap 1020 may be located at about half a distance along the upper straps 1004 and/or 1014, as measured from a first end of the upper straps 804 and/or 1014 at the connectors 1008/1018 to a second end of the upper straps 1004 and/or 1014 located at a seat (or other vehicle component) to which the seatbelt harness 1000 is attached. In some examples, the shoulder strap 1020 may be located relatively closer to the second end of the upper straps 1004 and/or 1014 than to the first end of the upper straps 1004 and/or 1014 (e.g., to be placed near the armpit or chest of a person using the seatbelt 1000).

In some examples, the seatbelt 1000 includes a web 1022 that extends between the shoulder strap 1020 and the at least one of the upper straps 1004, 1014. In examples where the shoulder strap 1020 extends from the upper strap 1004 and/or 1014 at an acute angle, as discussed above, the web 1022 may extend between the shoulder strap 1020 and the at least one of the upper straps 1004, 1014, across the acute angle.

The shoulder strap 1020 limits shoulder abduction to reduce upper extremity movement during vehicle events. As a user of the seatbelt 1000 abducts their shoulder, the shoulder strap 1020 is configured to limit range of motion below a prescribed level. In some examples, enough slack is present in the shoulder strap 1020 to make the extra coverage relatively unnoticeable and/or non-intrusive to a normal riding posture. In some examples where the seatbelt 1000 may be stowed, when the seatbelt 1000 is stowed, the web 1022 may retract away with the seatbelt 1000.

In some examples, the shoulder strap 1020 may be adjustable, such as to configure how tight/loose the shoulder strap 1020 is against a user of the seatbelt 1000. In some examples, the shoulder strap 1020 may be labelled, such as to notify users of the seatbelt 1000 as to where the shoulder strap 1020 should be located on their body. In some examples, the shoulder strap 1020 may be removably coupled to the upper strap 1004 and/or 1014 of the seatbelt 1000, such that the seatbelt 1000 can be functional without the shoulder strap 1020.

Figure 11A:
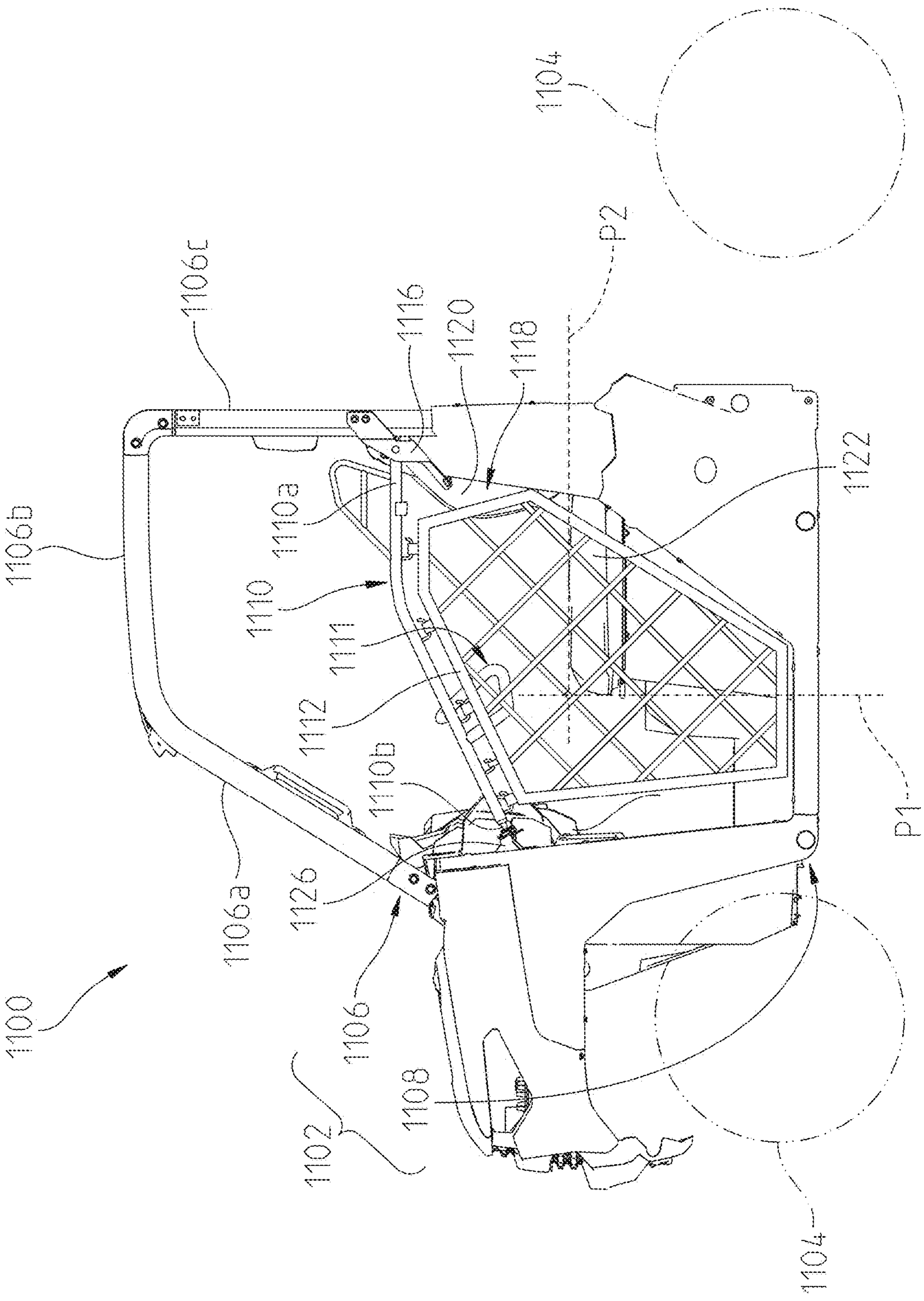
FIG. 11A illustrates an example vehicle, according to some aspects described herein.
Figure 11B:
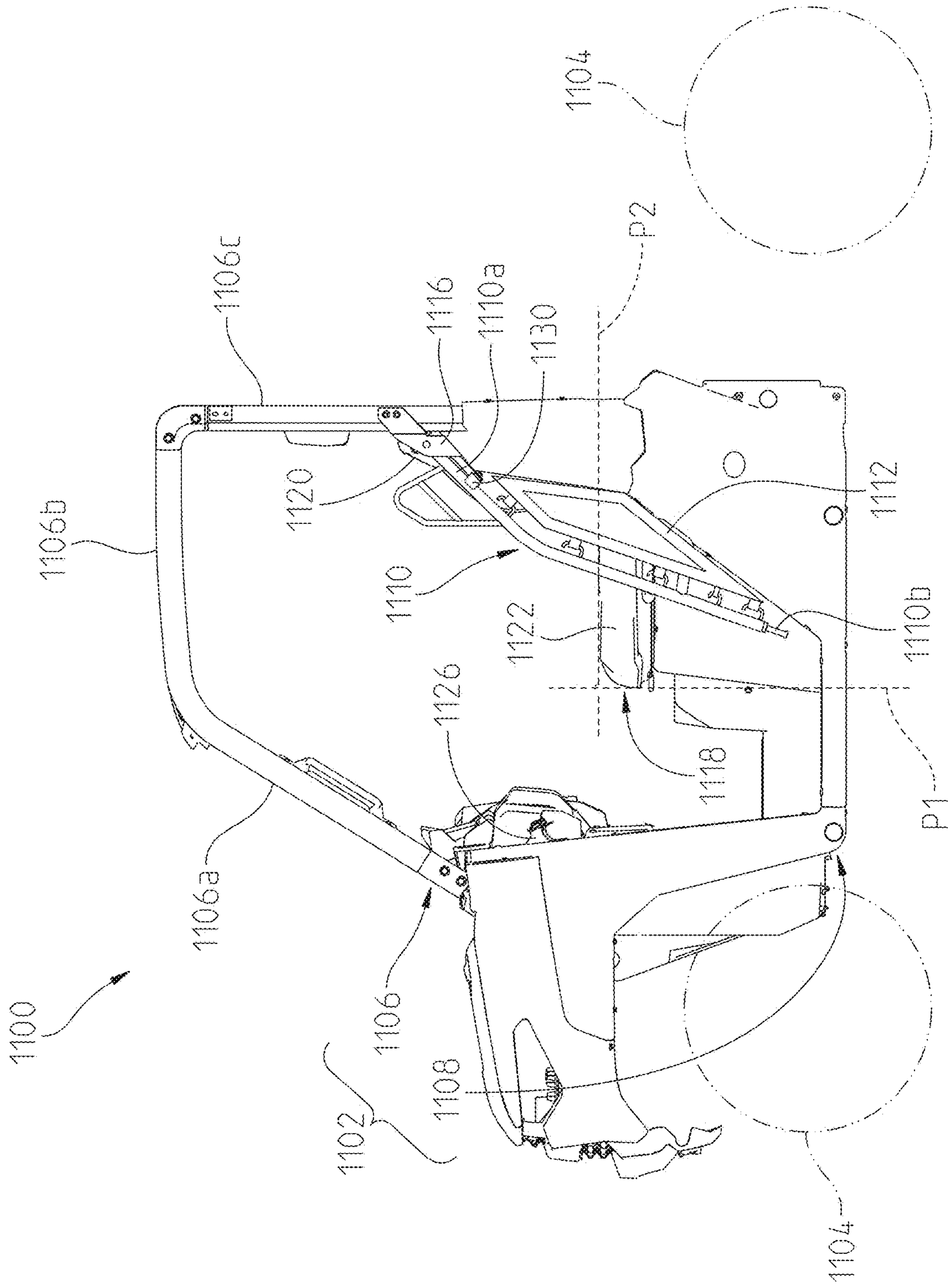
FIG. 11B illustrates an example vehicle, according to some aspects described herein.

FIGS. 11A and 11B illustrate an example vehicle 1100 according to some aspects described herein. The vehicle 1100 may be similar to the vehicle 200 described earlier herein with respect to FIG. 2, except for the differences described below. For example the vehicle 1100 includes a frame 1102. The frame may be coupled to a plurality of ground engaging members 1104 (which may be similar to the ground engaging members 204 of FIG. 2). The frame 1102 includes an upper frame 1106 and a lower frame 1108. The upper frame 1106 may include a front section 1106*a*, a center section 1106*b*, and a rear section 1106*c*. The front section 1106*a*, the center section 1106*b*, and rear section 1106*c* may be removably coupled to each other and/or removably coupled to the lower frame 1108.

A rotating arm 1110 is coupled to the frame, at a vertical height greater than that of the ground engaging members 1104 relative to the ground surface. Further, a net 1112 may be attached to the underside of the rotating arm 1110. The underside of the rotating arm 1110 is the side generally facing and vertically closest to the ground surface and/or the plurality of ground engaging members 1104. The net 1112 may be attached to the rotating arm 1110 via ties, fasteners, hooks, and/or other connection techniques that may be recognized by those of ordinary skill in the art. In various embodiments, a net may be positioned along an upper surface of the rotating arm 1110, either as an alternative to net 1112 or in addition thereto.

The rotating arm 1110 may be made of metal or another durable material that has properties to sustain substantial forces, such as forces greater than about 100 pounds of force (e.g., 150 pounds of force). While only one rotating arm 1110 and net 1112 are shown in FIGS. 11A and 11B, it should be recognized that there may be a rotating arm 1110 and/or net 1112 on both a driver-side and passenger side of the vehicle 1000. Alternatively, in some examples, there may be a rotating arm 1110 and/or net 1112 on only one of the driver-side or the passenger side of the vehicle 1000.

In some examples, the rotating arm 1110 includes a handle 1111 extending therefrom. In some examples, the handle 1111 can be used by an occupant of the vehicle 1100 to rotate the rotating arm 1110. In some examples, the handle 1111, can provide a support for an occupant of the vehicle 1100 to hold onto, such as when the vehicle 1100 is moving or is stationary. In some examples, the handle 1111 extends downward from the rotating arm 1110. In some examples, the handle 1111 has a curved shape, such as to provide an ergonomic design comfortable for an occupant of the vehicle 1100 to hold. In some examples, the handle 1111 forms an aperture with the rotating arm 1110 that is sized and shaped for one or more hands of an occupant to fit through when holding the handle 1111.

In FIG. 11A, the rotating arm 1110 is shown in a first or raised (e.g., up) position, and in FIG. 11B, the rotating arm 1110 is shown in a second or down (e.g., lowered) position. The rotating arm 1110 includes a first end 1110*a* and a second end 1110*b*, which are laterally opposed from one another. The first end 1110*a* of the rotating arm 1110 couples to the frame 1102 at a pivot mount 1116. For example, the pivot mount 1116 may be bolted to the frame 1102 at a position generally adjacent a portion of the seat 1118. Specifically, the pivot mount 1116 may be bolted to the upper frame 1106, and more specifically, to the rear section 1106*c* of the upper frame 1106.

In some examples, the pivot mount 1116 may include one or more detents and/or one or more friction hinges to control movement of the rotating arm 1110. Further, in some examples, the pivot mount 1116 substantially limits movement of the rotating arm 1110 to two dimensions (e.g., two dimensions selected from an x-direction, a y-direction, and a z-direction). Movement of the rotating arm 1110 may be limited to a set degree of angular rotation about the pivot mount 1116 (e.g., an angular rotation of less than 90 degrees).

In some examples, the vehicle 1000 further includes one or more seats 1118. In some examples, the frame 1102 defines an operator compartment, in which an operator sits on at least one of the one or more seats 1118. The one or more seats 1118 may be similar to the one or more seats 218 and/or 312 described earlier herein with respect to FIGS. 2 and 3, respectively. The seat 1118 may include a seat back 1120 and a seat bottom 1122. A front of the seat bottom 1122 may define a vertical plane P1. A top of the seat bottom 1122 may define a horizontal plane P2. In some examples, the pivot mount 1116 is disposed above the horizontal plane P1 and rearward of the vertical plane P2. In some examples, the handle 1111 is disposed above the vertical plane P2 and/or below a top of the one or more seats 1118 when the rotating arm 1110 is in the raised position, such as to provide comfortable placement for an occupant of the vehicle 1100 to grab the handle 1111.

In some examples, the second end 1110*b* of the rotating arm 1110 defines and/or includes a striker. The striker is rotatable between the first position (e.g., raised or up position) and the second position (e.g., lowered or down position). The second end 1110*b* of the rotating arm 1110 couples to the frame 1102 at a latch 1126. For example, the latch 1126 may be bolted or otherwise coupled to the frame 1102 at a position forward of seat 1118 and, in some embodiments, at a position generally adjacent a portion of the dashboard of the vehicle 1100. When the rotating arm 1110 is in the first or raised position (e.g., as shown in FIG. 11A), the striker at the second end 1110*b* of the rotating arm 1110 engages with the latch 1126, thereby raising the net 1112 across at least a portion of the frame 1102. In some examples, the striker at the second end 1110*b* self-aligns with the latch 1126, for ease of engagement by a user. Generally, the rotating arm 1110 and net 1112 may extend across where a door may be otherwise located on the vehicle 1100 (e.g., as shown in the vehicle 200 of FIG. 2).

In some examples, the vehicle 1100 includes a sensor (not shown) that is programmed to detect whether the rotating arm is in the first position (e.g., shown in FIG. 11A) or the second position (e.g., shown in FIG. 11B). In some examples, the vehicle 1100 further includes a controller (e.g., computing device 102 of FIG. 1) in communication with the sensor. In some examples, the controller is programmed to adapt one or more settings of the vehicle, based on the detection of the sensor (e.g., a detection as to in which position the rotating arm is located). For example, if the rotating arm 1110 is in the lowered position, then the one or more settings may include imposing a maximum throttle level, a power on/off control, a maximum speed (e.g., speed delimiting), a maximum pitch, etc. Additional and/or alternative settings of the vehicle that may be adapted should be recognized by those of ordinary skill in the art.

Referring specifically to FIG. 11B, the frame 1102 and/or the pivot mount 1116 may include a recess, brake, or other securing feature 1130. When the arm 1110 is in the down position, the arm 1110 may engage the recess 1120, thereby securing the net 1112 and/or arm 1110 in the down position. In some examples, the recess 1130 includes a magnet. In some examples, the recess 1130 includes a door hold.

Figure 12A:
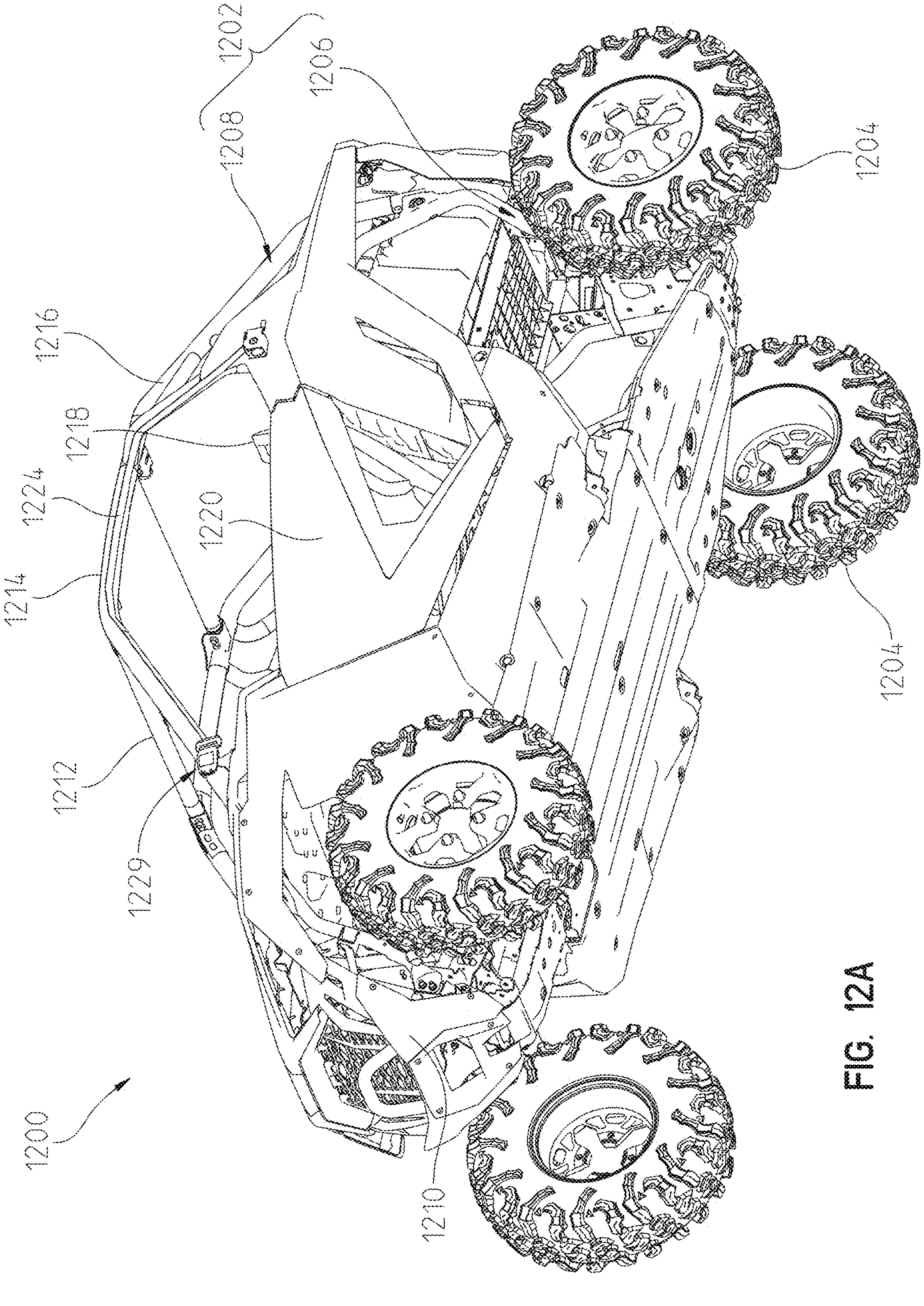
FIG. 12A illustrates an example vehicle with a retention feature, such as webbing, according to some aspects described herein.
Figure 12B:
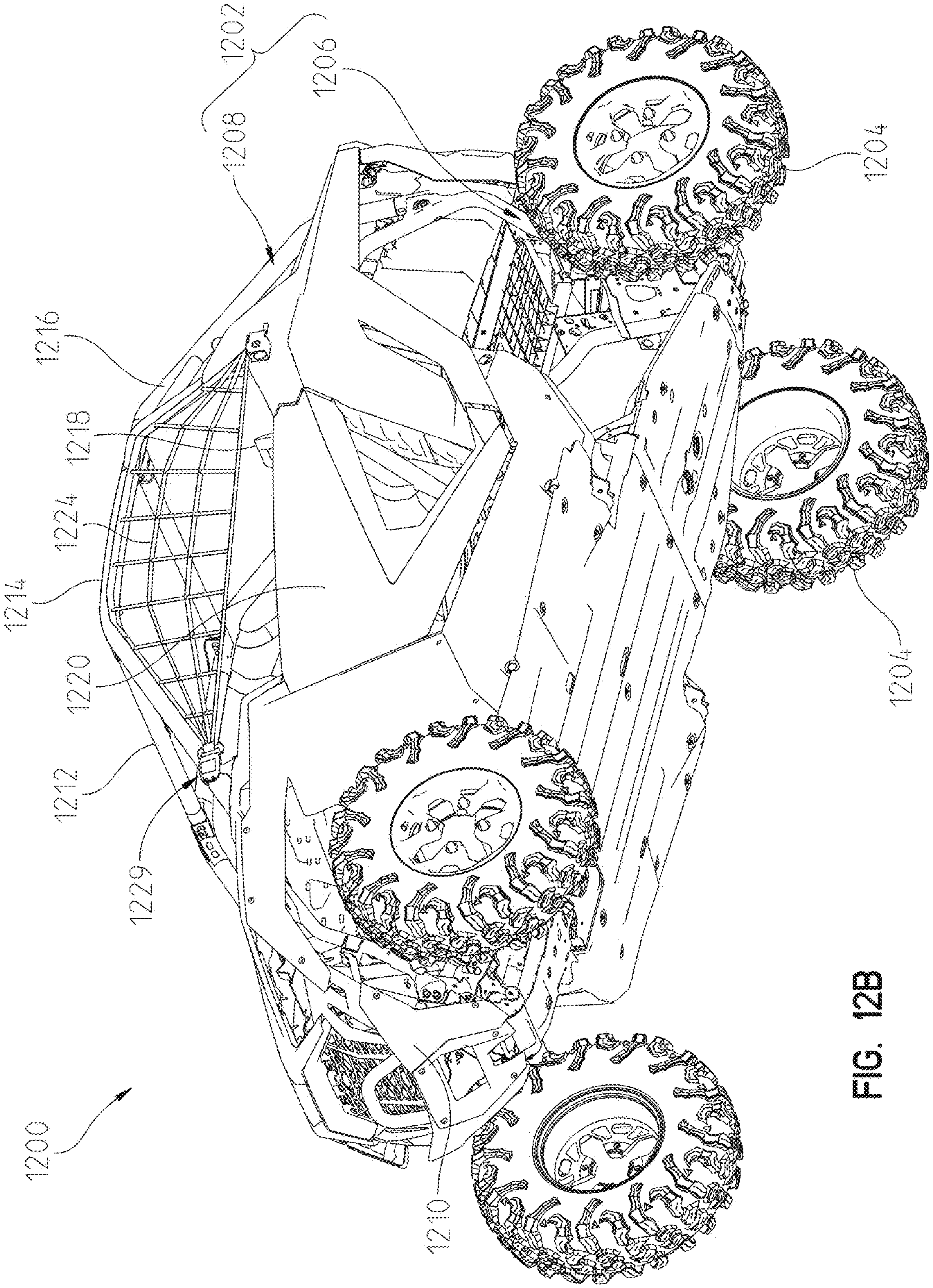
FIG. 12B illustrates the example vehicle of FIG. 12A, according to some aspects described herein.

FIGS. 12A and 12B illustrate an example vehicle 1200 according to some aspects described herein. The vehicle 1200 is merely an example and those of ordinary skill in the art will recognize other types of vehicles to which teachings of the present disclosure may be applied. For example, types of vehicles that may incorporate mechanisms to prevent and manage vehicle events, as provided herein, may include: an all-terrain vehicle (ATV), a utility vehicle (UTV), an on-road vehicle, an off-road vehicle, a motorcycle, a snowmobile, a moped, a pontoon boat, a jet ski, a speedboat, or another type of vehicle that may be recognized by those of ordinary skill in the art. The vehicle 1100 may be similar to the vehicle 200 described earlier herein with respect to FIG. 2, except for the differences described below.

The vehicle 1200 includes a frame 1202 and one or more ground engaging members 1204 (e.g., wheels and tires). The frame 1202 includes a lower frame 1206 and an upper frame 1208.

The one or more ground engaging members 1204 are operably coupled to the lower frame 1206 while the upper frame 1208 may extend generally over the operator area of vehicle 200. The vehicle further includes a drivetrain 1210 operably coupled to the lower frame 1206 and drivingly connected to one or more of the ground engaging members 1204. The upper frame 1208 includes a front section 1212, a center section 1214, and a rear section 1216. The front, center, and rear sections 1212, 1214, 1216 may couple to each other and to the lower frame 1206.

In examples, the drivetrain 1210 is comprised of a fuel-burning engine and transmission combination, together with a driveshaft extending between the drivetrain and two of the ground engaging members 1214. As another example, the drivetrain 1210 could be a hybrid, fuel cell, or electric drivetrain, among other examples. The drivetrain 1210, related front and rear suspension assemblies, and steering assemblies are more thoroughly described in our application Ser. No. 17/223,717, filed Apr. 6, 2021, Ser. No. 11/494,891 filed Jul. 28, 2006, and Ser. No. 11/494,890, filed Jul. 28, 2006, the subject matter of which is incorporated herein by reference.

The vehicle 1200 further includes one or more seats 1218. In some examples, the frame 1202 defines an operator compartment, in which an operator sits on at least one of the one or more seats 1218. The one or more seats 1218 may be a plurality of seats, such as side-by-side seats. In the illustrated example of FIG. 12, the one or more seats 1218 are bucket seats. The one or more seats may be similar to the seat 310 of FIG. 3. In some examples, the one or more seats 1218 include a seat harness or seatbelt, such as the seatbelt 800, 900, and/or 1000, discussed earlier herein with respect to FIGS. 8, 9, and 10.

The vehicle 1200 may include a footwell (not shown) into where feet of occupants of the vehicle 1200 extend. For example, the footwell may be located within the operator compartment defined by the frame 1202. The footwell may include one or more operator inputs, for example pedals, such as a gas pedal, a brake pedal, and or a clutch pedal. One or more occupants sitting in the seats 1218 may have feet that extend into the footwell of the vehicle 1200. The footwell may be similar to the footwell 1602, discussed earlier herein with respect to FIG. 6.

The drivetrain 1210 may be in communication with a controller, such as the controller 102 discussed earlier herein with respect to FIG. 1. The controller may control the drivetrain 210, such as to control speed and/or acceleration of the vehicle 1200. In some examples, the controller controls a battery and/or engine of the vehicle 1200. In some examples, the vehicle 1200 includes climate control settings, light/visibility settings, audio/entertainment settings, seat position settings, and/or suspension settings which are controlled by the controller and/or another computing device included in the vehicle 1200.

The vehicle 1200 further includes doors 1220. In some examples, the vehicle 1200 does not include doors 1220. For example, in some instances, the vehicle 1200 includes a rotating arm and/or a net, instead of the doors 1220. Such an example of a vehicle with a rotating arm and net, instead of the doors 1220, is illustrated via the rotating arm 1110 and the net 1112 of FIGS. 11A and 11B.

The vehicle 1200 further includes a webbing or retention feature 1224 coupled to the frame 1202 and a retractor 1230 for the webbing, also coupled to the frame 1202. FIG. 12A illustrates the webbing 1224 in a stored or inactive position and FIG. 12B illustrates the webbing 1224 in a deployed or activated position. The retractor 1230 may transition the webbing 1224 between the stored position and the deployed position (e.g., from the stored position to the deployed position). When considering implementation of a deployed webbing system as described herein, a vehicle manufacturer will need to evaluate multiple factors and apply engineering judgment to assess, among other things, a benefit to occupants. These may include but are not limited to ability to ingress and egress from a vehicle, occupants' visibility, and the ability of a webbing system to be affixed to modified vehicle with aftermarket parts.

In some examples, the webbing 1224 extends substantially parallel to the door 1220 (e.g., coplanar with a vertical plane of the door), in response to the retractor 1230 being activated (e.g., as shown in FIG. 12B). Additionally, or alternatively, in some examples, the webbing 1224 extends substantially orthogonal to the door 1220, in response to the retractor 1230 being activated. For example, the webbing 1224 may extend parallel to a front of the vehicle 1200, and in front of the seat 1218, such as to control movement of an occupant's helmet in the forward and/or rearward direction.

While only one webbing 1224 and retractor 1230 are shown in FIGS. 12A and 12B, it should be recognized that there may be a webbing 1224 and/or retractor 1230 on both a driver side and passenger side of the vehicle 1200. Alternatively, in some examples, there may be a webbing 1224 and/or retractor 1230 on only one of the driver-side or the passenger side of the vehicle 1200. Further, there may be one or more webbings 1124 extending (or configured to extend) between the driver-side and passenger-side of the vehicle 1200 (e.g., in examples where the vehicle 1200 includes a webbing that extends substantially orthogonal to the door 1220, as discussed above).

Additional and/or alternative components that may be part of the vehicle 1200 will be recognized by those of ordinary skill in the art, at least in light of teachings provided herein. Further, components of other types of vehicles that may incorporate mechanisms provided herein (e.g., ATVs, UTVs, on-road vehicles, off-road vehicles, motorcycles, snowmobiles, mopeds, and/or watercraft) will be recognized by those of ordinary skill in the art.

Figure 13A:
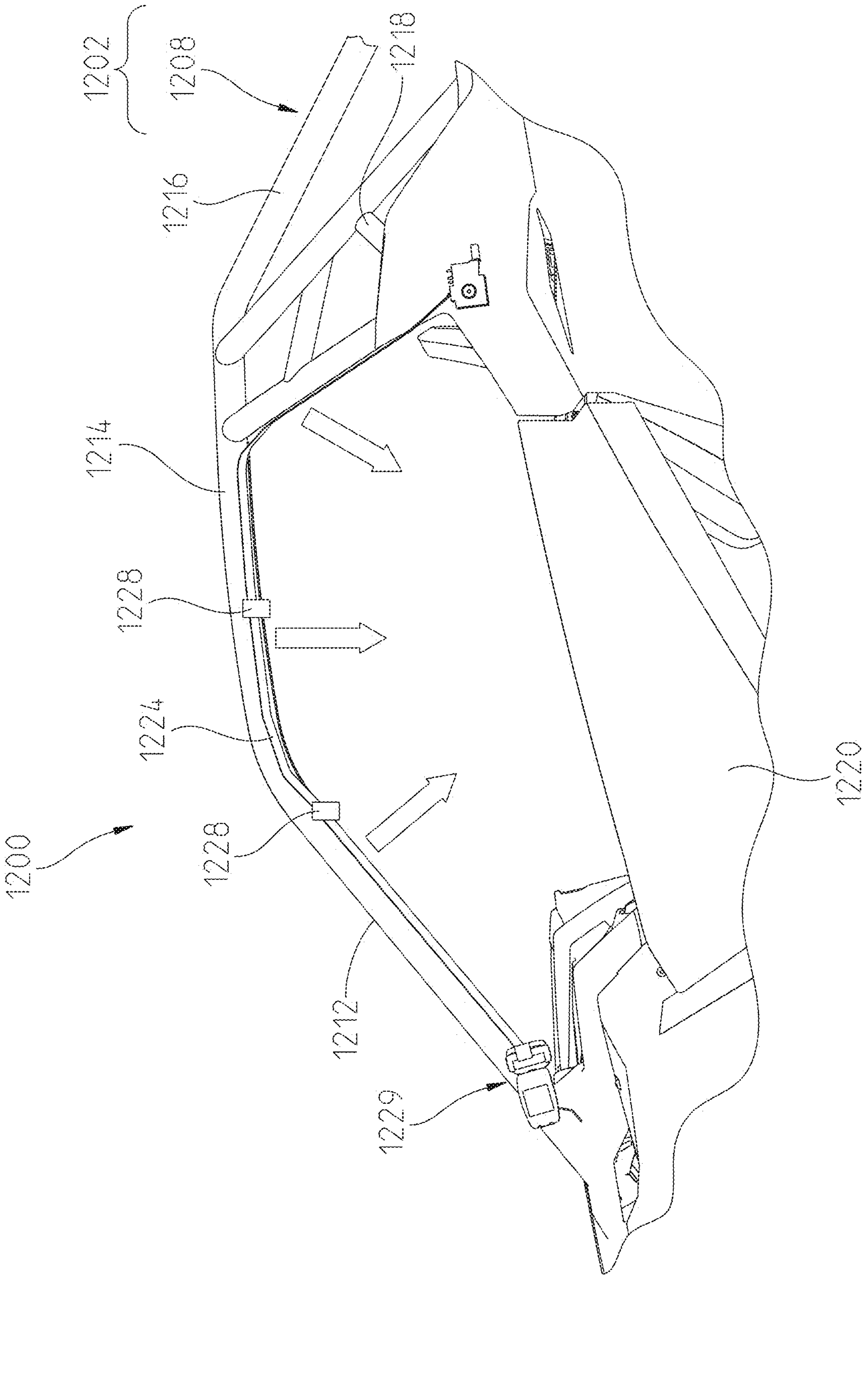
FIG. 13A illustrates the retention feature of FIG. 12A, according to some aspects described herein.
Figure 13B:
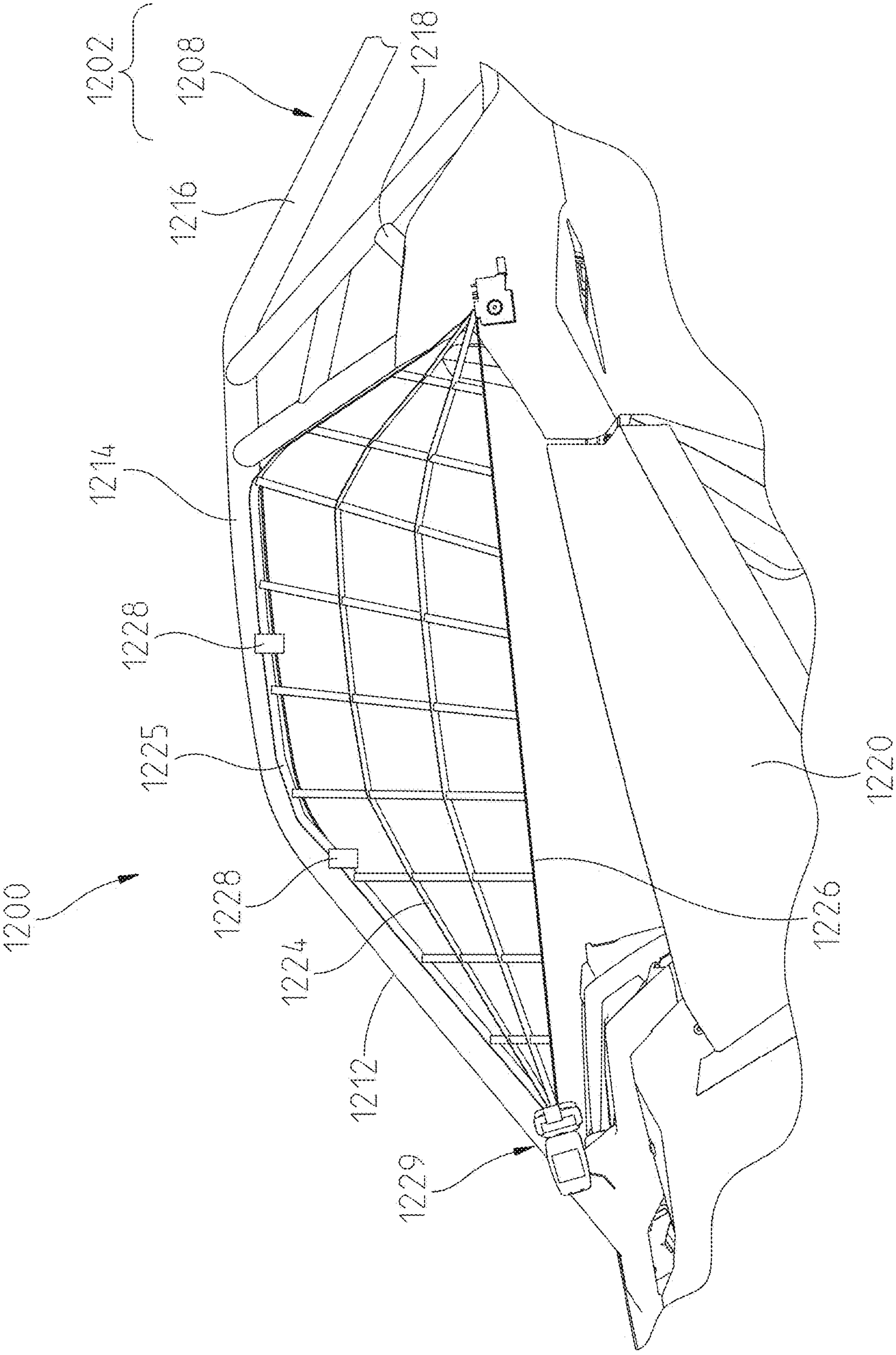
FIG. 13B illustrates the retention feature of FIG. 12A, according to some aspects described herein.

FIGS. 13A and 13B illustrate a detailed view of the webbing 1224 of FIGS. 12A and 12B, according to some aspects described herein. In FIG. 13A, the webbing 1224 is shown in the stored position and in FIG. 13B, the webbing 1224 is shown in the deployed position. In some examples, the webbing 1224 includes an upper webbing 1225 and a lower webbing 1226 (as shown in FIG. 13B). The upper webbing 1225 may be rigidly fixed to the frame 1202. Further, the lower webbing 1226 may be fixedly coupled to the retractor 1230. In some examples, the upper webbing 1225 may be fixed to the upper frame 1208 (e.g., at the front section 1212, the center section 1214, and/or the rear section 1216).

In some examples, the lower webbing 1226 is coupled to the frame 1202 via one or more connectors 1228, when in a stored position. In some examples, the lower webbing 1226 is coupled to the upper frame 1208 (e.g., at the front section 1212, the center section 1214, and/or the rear section 1216) via the one or more connectors 1228. The retractor 1230 is configured to break, pull apart, or otherwise overcome the one or more connectors 1228, when activated. Accordingly, the retractor 1230 is configured to expand the webbing 1224, across at least a portion of the frame 1202, to a deployed position (e.g., the position shown in FIG. 13B).

The one or more connectors 1228 may include adhesive (e.g., with a bond that can be broken by the retractor 1230), hook and loop fasteners, ties (e.g., comprising fabric and/or plastic), magnetic couplings (e.g., that are weak enough to be overcome by the retractor 1230), or another type of connector recognized by those of ordinary skill in the art that can be broken, pulled apart, or otherwise overcome by the retractor 1230, when the retractor 1230 is activated.

Figure 14:
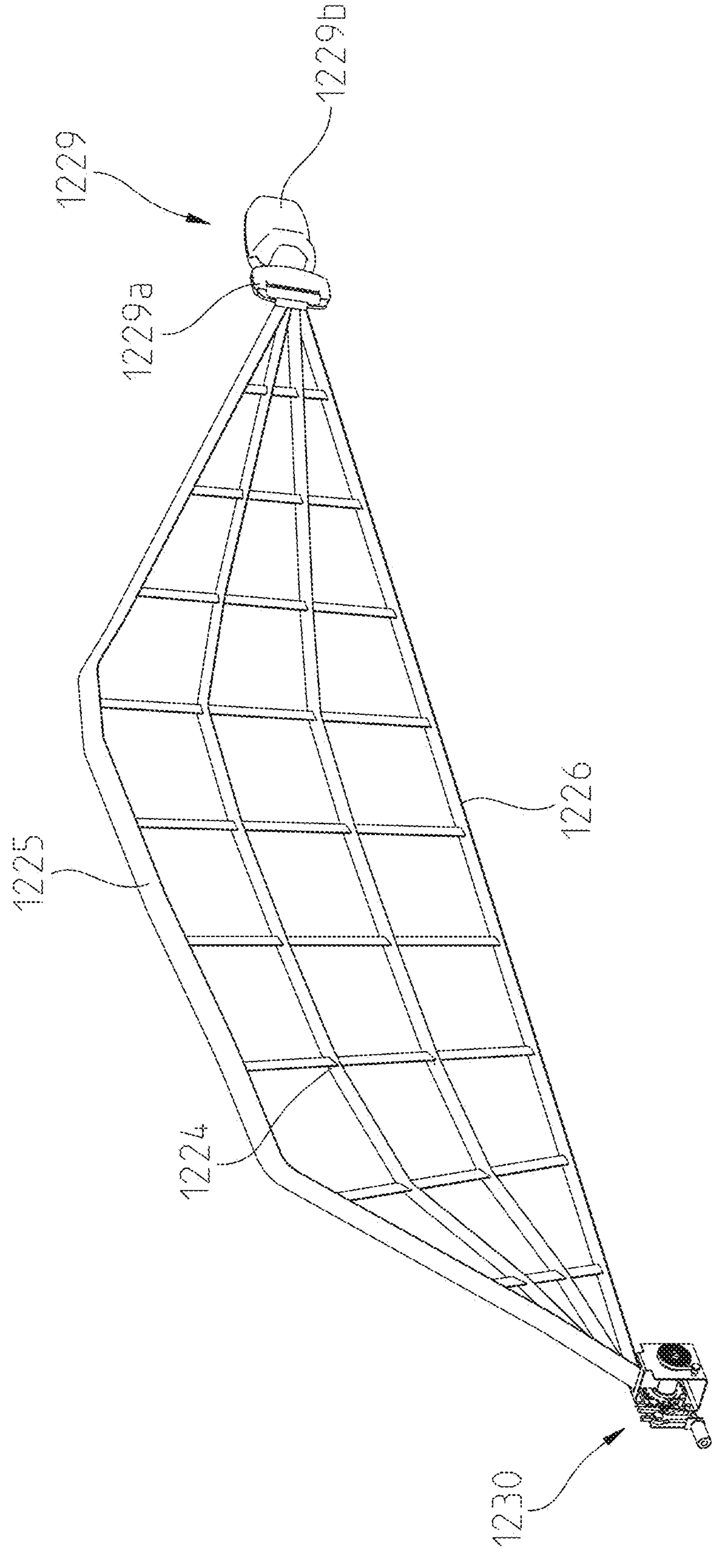
FIG. 14 illustrates the retention feature of FIG. 12A, according to some aspects described herein.
Figure 15:
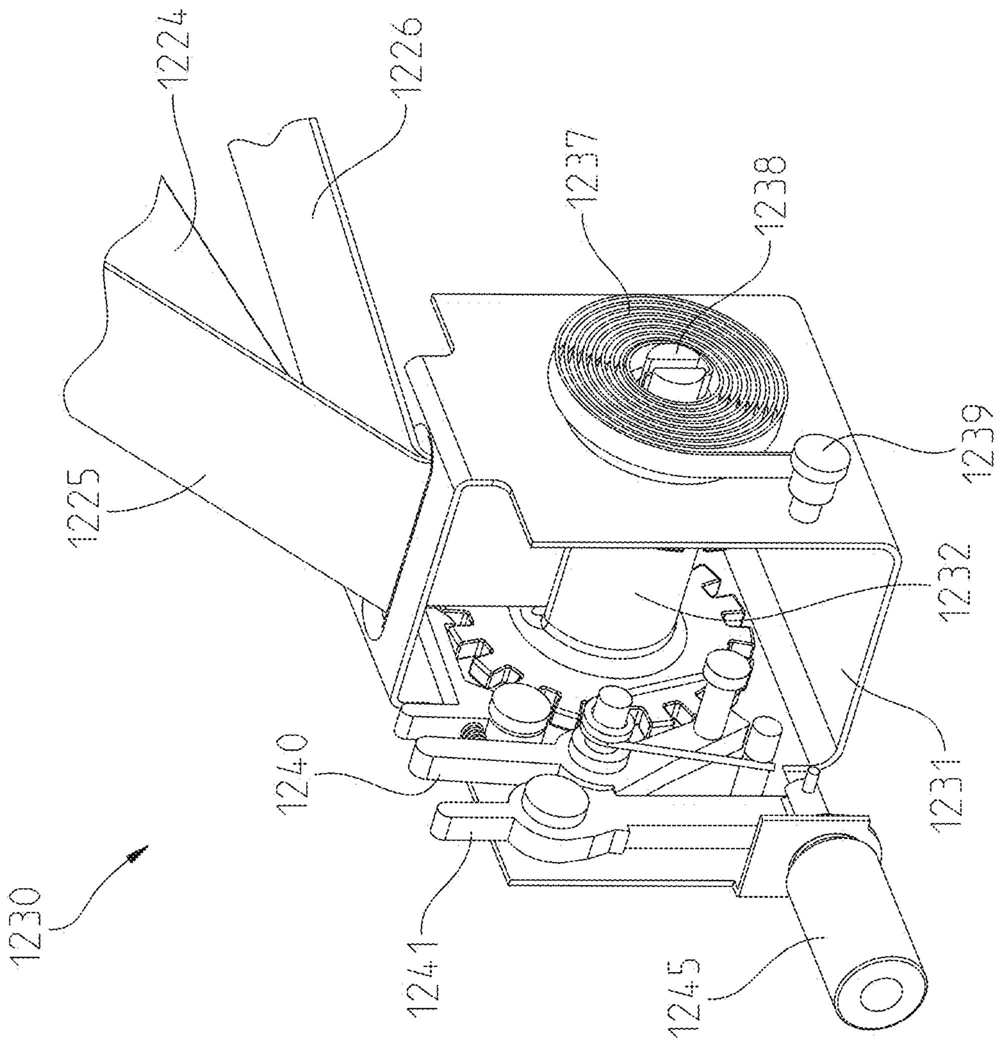
FIG. 15 illustrates a retractor, according to some aspects described herein.
Figure 16:
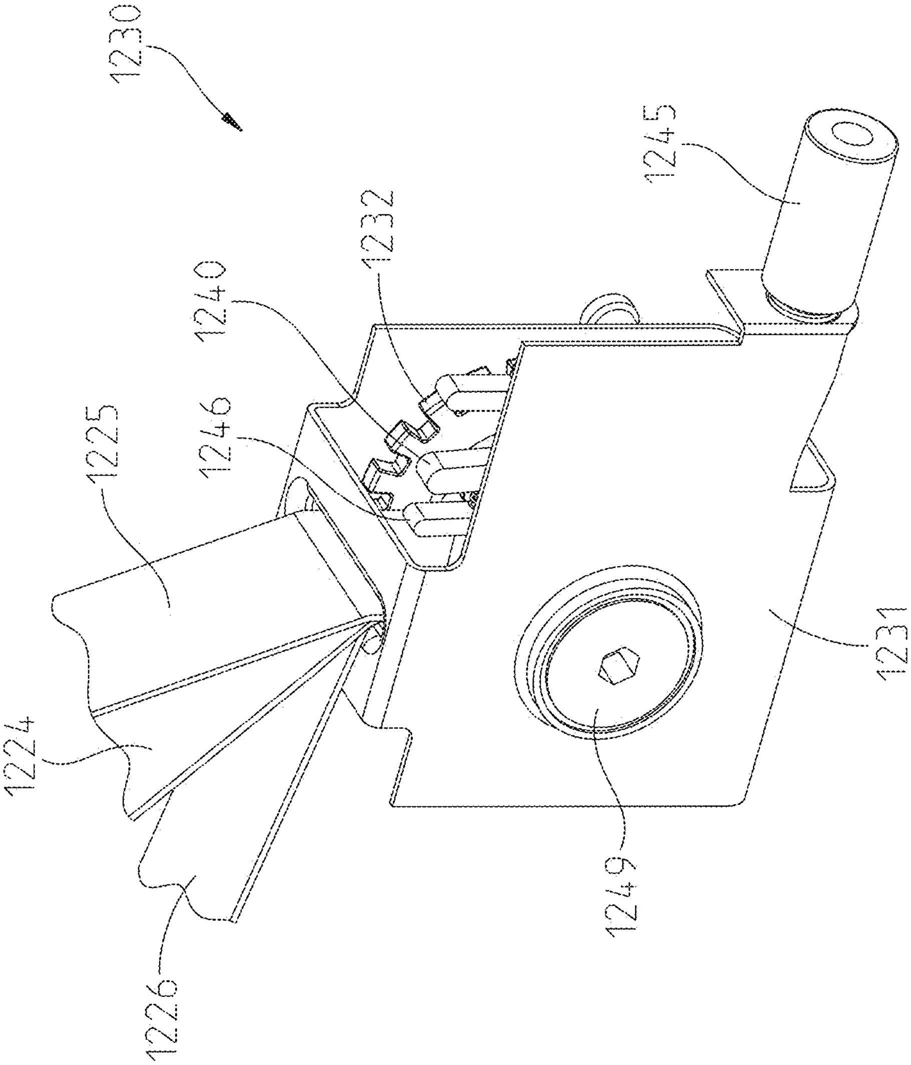
FIG. 16 illustrates the retractor of FIG. 15, according to some aspects described herein.
Figure 17:
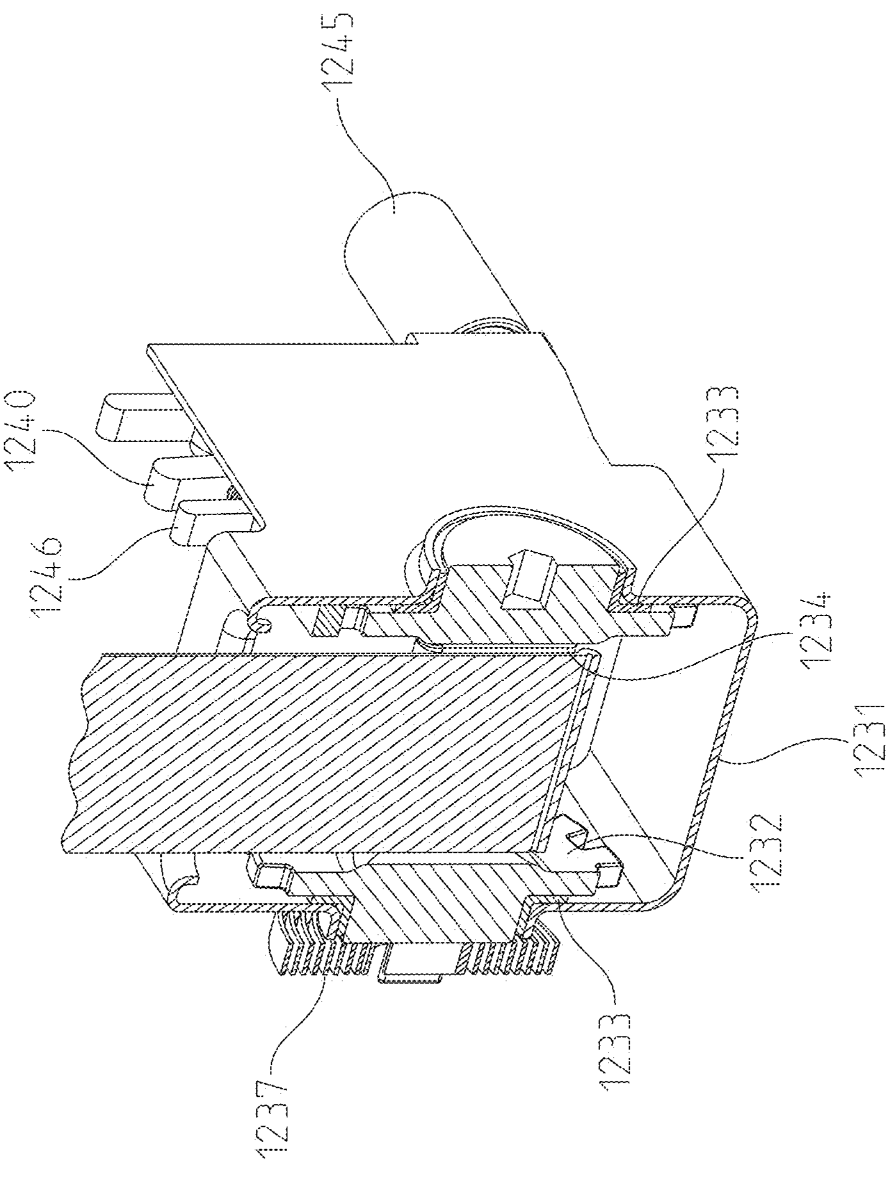
FIG. 17 illustrates the retractor of FIG. 15, according to some aspects described herein.
Figure 18:
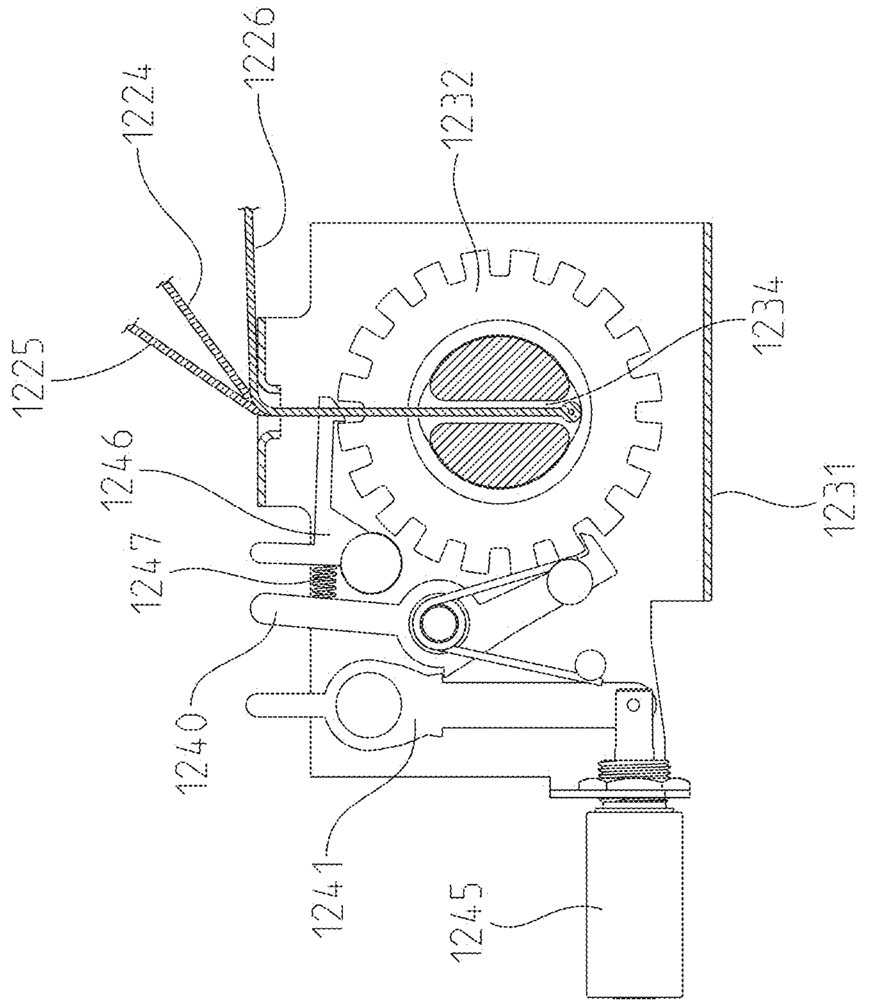
FIG. 18 illustrates the retractor of FIG. 15, according to some aspects described herein.

FIG. 14 illustrates the webbing 1223 and the retractor 1230 described earlier herein with respect to FIGS. 12A, 12B, 13A, and 13B. In some examples, the webbing 1123 may include a buckle 1229. For example, the buckle 1229 may include a male connector 1229*a* coupled to the webbing 1123 and a female connector 1229*b* coupled to the frame 1202 (e.g., the upper frame 1208). Accordingly, the webbing 1223 may be buckled/unbuckled at the buckle 1229, such as to attach/detach from the frame 1202.

FIGS. 15-18 illustrate the retractor 1230 according to some aspects described herein. The retractor 1230 includes a housing 1231 that is attached to a frame of a vehicle (e.g., frame 1202 of vehicle 1200). The retractor 1230 further includes a spool 1232 and bushings 1233 within the housing 1232. The spool 1232 is held via bushings 1233, within the housing 1231. The bushings 1233 allow the spool 1232 to rotate freely. The spool 1232 is a spool for the webbing 1224.

The housing 1231 rigidly attaches the spool 1232 to the frame 1202 of the vehicle 1200. The spool 1232 includes a slot 1234 extending through a center portion of the spool 1232 to facilitate fixing of the webbing 1224. An outer rim of the spool 1232 contains teeth that engage with various other components in order to provide retraction and locking functionality. A torsional spring 1237 is attached the spool 1232. For example, the torsional spring 1237 may be attached to one end of the spool 1232 via a slot 1238 and to the housing 1231 via a pin 1239.

The torsional spring 1237 may be wound like a clock spring in order to provide sufficient torque to retract the lower webbing 1226 of the webbing 1224. The torsional spring 1237 causes the spool 1232 to rotate, in response to the retractor 1230 being activated. A locking pawl 1240 is rotatably attached to the housing 1221. A tooth of the pawl 1240 engages with the teeth in the spool 1232 and prevents the spool 1232 from rotating under a force of the torsion spring 1237. A sear 1241 is rotatably attached to the housing 1231 next to the locking pawl 1240 in such a manner that it prevents rotation of the pawl 1240 away from the spool 1232, thereby locking the retractor 1230.

An electric solenoid 1245 is attached to the housing 1231 and arrayed such that when it is energized, it moves the sear 1241 away from the pawl 1240. This movement (e.g., pulling movement) causes the pawl 1240 to rotate away from the teeth in the spool 1232, allowing the torsional spring 1237 to rotate the spool 1232, winding the webbing 1224 (e.g., specifically, the lower webbing 1226) into the retractor 1230. The winding of the webbing 1224 pulls the lower webbing 1226 down and away from the frame 1202 to which the lower webbing 1226 is coupled, thereby expanding the webbing 1224.

In some examples, the pawl 1240 is a first pawl, and the retractor 1230 includes a second pawl 1246 that is arranged opposite to the first pawl 1240, such that when the spool 1232 rotates to retract the webbing 1224, the second pawl 1246 prevents the spool 1232 from being rotated such that webbing 1224 pays out. In this way, once at least some slack in the webbing 1224 has been taken out, the webbing 1224 cannot be pulled out of the retractor 1230 without disengaging the second pawl 1246.

In some examples, the second pawl 1246 is forced to engage with the teeth in the spool 1232 by a compression spring 1247 disposed between the first pawl 1240 and the second pawl 1246. In some examples, the retractor 1230 includes one or more reset levers 1248 for a technician to reset the retractor 1230 without having to disassemble the retractor 1230. In some examples, the retractor 1230 includes an internal hex 1249 on a side of the spool 1232 to wind or unwind the spool 1232 (e.g., manually), if needed.

In some examples, the vehicle 1200 includes a controller (e.g., computing device 102 of FIG. 1) that is in communication with the retractor 1230. The retractor 1230 may be activated in response to one or more calculations by the controller. For example, the one or more calculations may be based on one or more selected from the group of: an acceleration of the vehicle, roll angle of the vehicle, and roll angle rate of change of the vehicle. The retractor 1230 may be activated by receiving a signal, such as a 12 volt DC signal, from the controller. The signal may be received at the solenoid 1245. In response to receiving the signal, the solenoid 1245 may cause the retractor to be activated (e.g., causing the spool 1232 to rotate and retract the webbing 1224.

Figure 19:
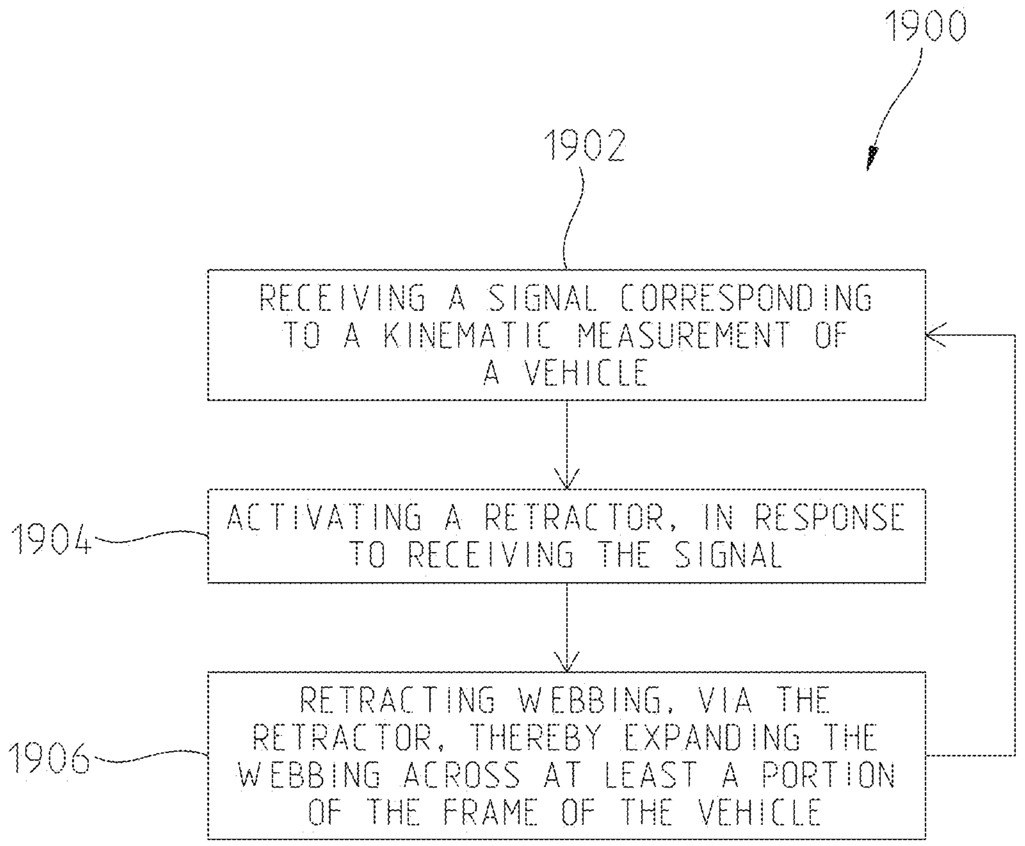
FIG. 19 illustrates an example method of deploying a webbing of a vehicle, according to some aspects described herein.

FIG. 19 illustrates an example method 1900 according to some aspects described herein. The example method 1900 may be a method for deploying a webbing of a vehicle, such as the webbing 1224 of vehicle 1200 discussed above with respect to FIGS. 12-18. The vehicle may include a frame and a retractor. The webbing may include an upper webbing fixedly coupled to the frame and a lower webbing fixedly coupled to the retractor. In examples, aspects of method 1900 are performed by a device, such as controller 322, computing device 102, and/or server 102, discussed earlier herein with respect to FIGS. 1 and 3.

Method 1900 begins at operation 1902, wherein a signal is received that corresponds to a kinematic measurement of a vehicle. The signal may be received from a controller of the vehicle and/or at the retractor (e.g., at the solenoid 1245 of the retractor 1230). The kinematic measurement of the vehicle may include one or more selected from the group of: an acceleration of the vehicle, roll angle of the vehicle, and roll angle rate of change of the vehicle. Additional and/or alternative kinematics measurements that may be received from a vehicle will be recognized by those of ordinary skill in the art, at least in light of the teachings provided herein.

At operation 1902, a retractor is activated in response to receiving the signal. The retractor may be the same or similar as retractor 1230 described earlier herein with respect to FIGS. 12-18. For example, the retractor may include a housing and a spool disposed within the housing. The lower webbing may be retracted about the spool. The retractor may further include a tortional spring that is attached to the spool. The torsional spring may cause the spool to rotate, in response to the retractor being activated at operation 1902.

At operation 1906, the webbing is retracted, via the retractor, thereby expanding the webbing across at least a portion of the frame of the vehicle. In some examples, the webbing extends substantially parallel to a door of the vehicle, in response to the retractor being activated (e.g., as shown in FIG. 12B). Additionally, or alternatively, in some examples, the webbing extends substantially orthogonal to the door, in response to the retractor being activated. For example, the webbing may extend parallel to a front of the vehicle, and in front of a seat (e.g., seat 1218 of FIGS. 12A-B), such as to control movement of an occupant's helmet in the forward and/or rearward direction.

Method 1900 may terminate at operation 1906. Alternatively, method 1900 may return to operation 1900, such as in examples where the webbing 1224 can be reset to the stored position.

FIG. 20 illustrates an example method according to some aspects described herein. The example method 2000 may be a method for deploying one or more occupant retention devices. In some examples, aspects of method 2000 are performed by a device, such as controller 322, computing device 102, and/or server 102, discussed earlier herein with respect to FIGS. 1 and 3.

Method 2000 begins at operation 2002, wherein a setting is received for a kinematic tolerance of a vehicle (e.g., vehicle 200). The setting may correspond to a pitch tolerance, a pitch rate of change tolerance, a roll rate tolerance (e.g., an angular velocity tolerance), an acceleration tolerance, a velocity tolerance, and/or another kinematic tolerance of the vehicle that may be recognized by those of ordinary skill in the art.

At operation 2004, an indication is received that corresponds to one or more kinematics of the vehicle. The indication may be received from one or more sensors of the vehicle, such as an accelerometer, a gyroscope, an inertial measurement unit (IMU), a suspension control module, and/or another sensor used to measure and/or derive kinematic values that may be recognized by those of ordinary skill in the art. The sensor from which the indication is received may be a vehicle sensor, an accessory sensor (e.g., of a jacket, collar, wearable accessory, etc.), a nomadic device sensor, and/or another intermediary computing device that may be recognized by those of ordinary skill in the art. Accordingly, the indication may correspond to a pitch, a pitch rate of change, a roll rate (e.g., an angular velocity), an acceleration, a velocity, an angular acceleration, and/or another kinematic factor of the vehicle that may be recognized by those of ordinary skill in the art.

In some examples, the indications that correspond to one or more kinematics of the vehicle are stored. For example, the indications may be stored such that analyses can be performed. In some examples, analyses are performed based on vehicle kinematics and known vehicle events (e.g., vehicle events known to a person or system performing the analysis). The analyses may be used to update the settings for the kinematic tolerance of the vehicle and/or for other improvements to systems and/or methods disclosed herein, as may be recognized by those of ordinary skill in the art.

At operation 2006, it is determined if the kinematic tolerance is exceeded (e.g., in a positive direction, or a negative direction, such as by increasing above the kinematic tolerance, or decreasing below the kinematic tolerance). For example, the indication received at operation 2004 may be compared to the kinematic tolerance setting received at operation 2002 to determine whether the kinematic tolerance is exceeded. In some examples, the kinematic tolerance may correspond to a single type of kinematic value (e.g., solely a roll rate, a pitch, etc.). In some examples, the kinematic tolerance may correspond to a plurality of kinematic values (e.g., a function in which two or more types of kinematic values are weighted together). For example, the kinematic tolerance may correspond to a first weighted amount of a roll rate value and a second weighted amount of a pitch value. Additional and/or alternative combinations of kinematic values will be recognized by those of ordinary skill in the art, at least in light of teachings provided herein.

In some examples, a vertical acceleration of the vehicle may not be a factor when determining if the kinematic tolerance is exceeded, such as because the vertical acceleration may be saturated during certain vehicle events (e.g., thereby producing misleading values). In some examples, the kinematic tolerance includes an acceleration threshold in a longitudinal and/or lateral direction of the vehicle, such as an acceleration threshold of greater than 2 Gs (i.e., double the acceleration of gravity). In some examples, a yaw axis of the vehicle may not be a factor when determining if the kinematic tolerance is exceeded, such as when a roll angle or roll angle is being monitored. In some examples, a pitch rate and/or roll rate of over 90 degrees/second exceeds the kinematic tolerance. For example, normal driving (which does not exceed the kinematic tolerance) may be in the range of about 50 to about 60 degrees/second on a roll or pitch axis of the vehicle.

If the kinematic tolerance is not exceeded, as indicated by "NO" in FIG. 20, method 2000 proceeds to operation 2008, where a default action is performed. For example, the indication corresponding to one or more kinematics of the vehicle may include a pre-configured action that is performed at operation 2008. Additionally, or alternatively, the default action may include storing one or more settings, storing the received indication, etc. In some examples, method 2000 may comprise determining whether the indication has an associated default action, such that, in some instances, no action may be performed as a result of receiving the indication. Method 2000 may terminate at operation 2008. Alternatively, method 2000 may return to operation 2002 to provide an iterative loop of receiving a setting for a kinematic tolerance of a vehicle, receiving an indication corresponding to one or more kinematics of the vehicle, and determining if the kinematic tolerance is exceeded.

However, if it is determined that the kinematic tolerance is exceeded, as indicated by "YES" in FIG. 20, method 2000 advances to operation 2010. In some examples, a number of instances that the kinematic tolerance is exceeded may be tracked and/or stored by mechanisms provided herein (e.g., with kinematic data accompanying the stored instances).

At operation 2010, one or more occupant retention devices are deployed. In some examples, the one or more occupant retention devices include one or more airbags (e.g., airbags 320 of FIGS. 3 and 4). In some examples, the one or more occupant retention devices include one or more nets or webbings (e.g., webbing 1224 of FIGS. 12-18). In some examples, the one or more occupant retention devices include one or more seat belts (e.g., seatbelt 800, seatbelt 900, and seatbelt 1000 of FIGS. 8-9). When the one or more occupant retention devices include one or more seat belts, the deploying of the occupant retention devices may include tensioning the seat belts. Generally, the one or more occupant retention devices may be configured or otherwise adapted to retain occupants within a vehicle, when the vehicle is subject to kinematics that exceed certain thresholds or tolerances.

In some examples, the occupant retention devices may be deployed relatively quickly after the kinematic tolerance is exceeded by the vehicle. For example, the occupant retention devices may be deployed within about 200 milliseconds after the kinematic tolerance is exceeded. Accordingly, the operations 2004, 2006, and 2010 may collectively be executed within about 200 milliseconds. In some examples, the operations 2004, 2006, and 2010 may collectively be executed in less than about 200 milliseconds and greater than 0 milliseconds.

Method 2000 may terminate at operation 2010. Alternatively, method 2000 may return to operation 2002 (or any other operation from method 2000) to provide an iterative loop, such as of determining whether one or more occupant retention devices should be deployed in response to one or more kinematic tolerances being exceeded, and then deploying the one or more occupant retention devices, if appropriate.

Figure 21:
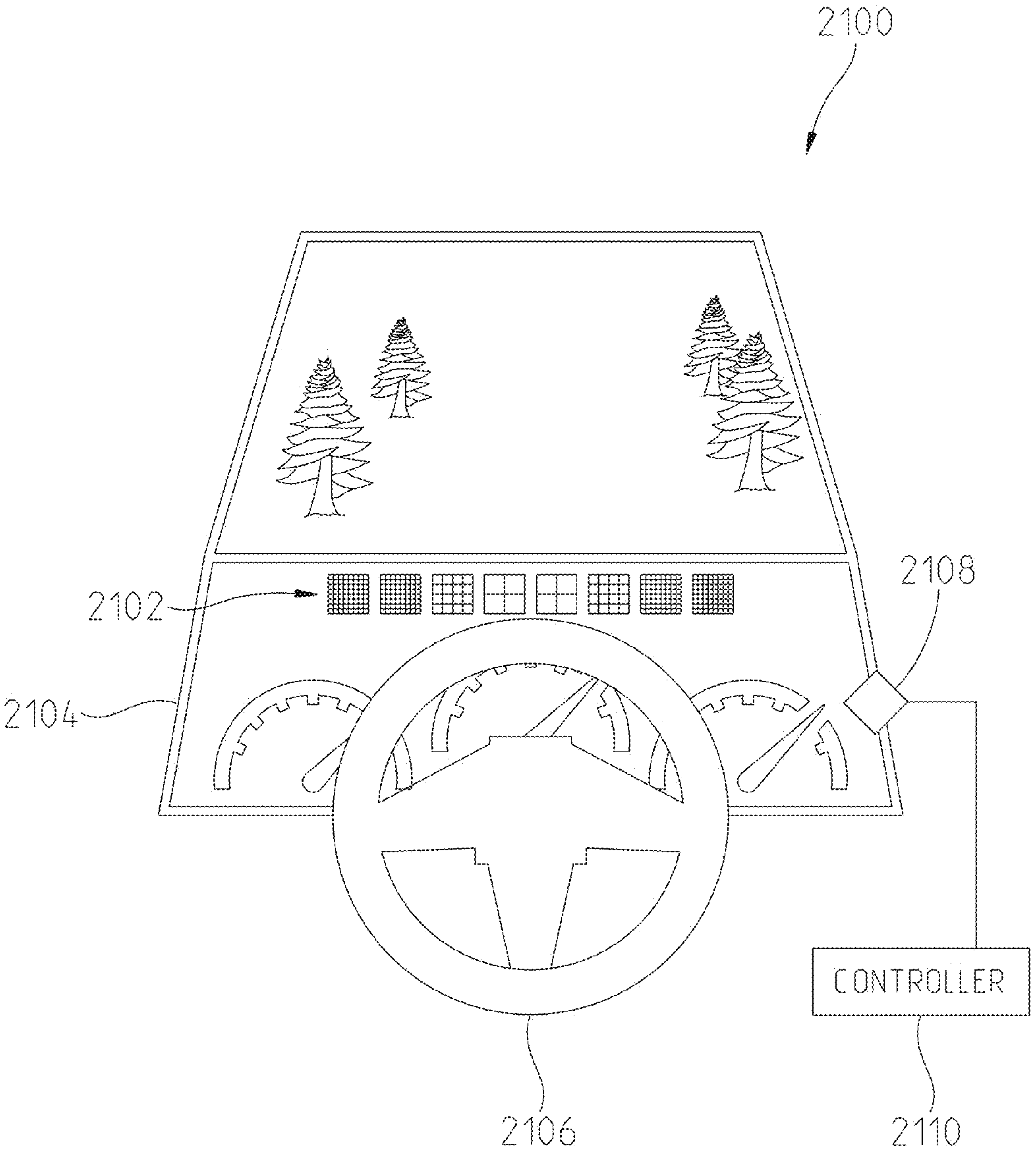
FIG. 21 illustrates an example vehicle, according to some aspects described herein.

FIG. 21 illustrates a portion of an example vehicle 2100 that includes one or more indicators 2102. The vehicle 2100 may be similar to the vehicle 200 described earlier herein with respect to FIG. 2. The vehicle may further include a dashboard 2104 and a steering wheel 2106. The one or more indicators 2102 may be disposed on at least one of the dashboard 2104 and/or the steering wheel 2106. The vehicle may further include one or more kinematic sensors 2108. The one or more kinematic sensors 2108 may include roll angle sensors, velocity sensors, acceleration sensors, rate of change of roll angle sensors, pitch angle sensors, rate of change of pitch angle sensors, yaw angle sensors, rate of change of yaw angle sensors, or other types of kinematic sensors that may be recognized by those of ordinary skill in the art.

In some examples, the vehicle 2100 includes a controller 2110 in communication with the one or more kinematic sensors (e.g., roll angle sensors). The controller 2110 may be similar to the computing device 102 and/or server 104 described earlier herein with respect to FIG. 1. The controller 2110 may include a processor and memory storing instructions that, when executed by the processor, cause the controller to perform a set of operations. For example, the set of operations may include receiving a signal from the one or more kinematic sensors 2108 (e.g., the one or more roll angle sensors) indicative of a kinematic activity of the vehicle 2100 (e.g., indicative of a roll angle of the vehicle), and adapting the one or more indicators 2102 to provide a notification that corresponds to the roll angle, based on the signal.

In some examples, a plurality of signals may be received from the one or more kinematic sensors 2108, at varying times, that each correspond to respective kinematic activity (e.g., roll angles) of the vehicle 2100. For example, a first signal may be received from the kinematic sensors 2108 that corresponds to a first kinematic value (e.g., a first roll angle), and a first notification may be provided the corresponds to the first kinematic value. In some examples, a second signal may be received from the kinematic sensors 2108 that corresponds to a second kinematic value (e.g., a second roll angle) of the vehicle 2100 (e.g., wherein the second kinematic value is different than the first kinematic value). The one or more indicators 2102 may be adapted to provide a second notification that corresponds to the second kinematic value, based on the second signal (e.g., wherein the second notification is different than the first notification).

Further, in some examples, a third signal may be received from the kinematic sensors 2108 that corresponds to a third kinematic value (e.g., third roll angle) of the vehicle 2100 (e.g., wherein the third kinematic value is different than the first and/or second kinematic values). The one or more indicators 2102 may be adapted to provide a third notification that corresponds to the third kinematic value, based on the third signal (e.g., wherein the third notification is different than the first and/or second notifications). Generally, any number of signals may be received that correspond to any number of respective kinematic values (e.g., roll angles), to provide respective notifications of the kinematic values.

In some examples, the one or more indicators 2102 are visual indicators and/or audio indicators. In some examples, the one or more indicators 2102 include one or more lights, such as one or more light emitting diodes (LEDs). In some examples the LEDs 2104 are disposed on the dashboard 2104 and/or the steering wheel 2106. In some examples, the vehicle 2100 includes a display (not shown), such as a display of an infotainment system. The one or more indicators 2102 may be generated by the display.

In some examples, the kinematic signals discussed herein may be mapped to certain notifications (e.g., configurations of the one or more indicators 2102), based on an experience level of a driver of the vehicle 2100. For example, if the driver of the vehicle has a first or beginner experience level, then a relatively higher kinematic threshold may be set which impacts what information the driver receives via the one or more indicators 2102. Comparatively, if the driver of the vehicle has a second or advanced experience level, then a relatively lower kinematic threshold may be set which impacts what information the driver receives via the one or more indicators 2102.

Generally, the one or more indicators 2102 provide information to a driver of the vehicle 2100 to provide an improved experience. Further, the one or more indicators 2102 may be helpful to prevent and or manage certain vehicle events (e.g., kinematic activity of the vehicle 2100 above certain thresholds), such as by notifying the driver about impending vehicle events, such that preventative action can be taken, if desired.

Figure 22A:
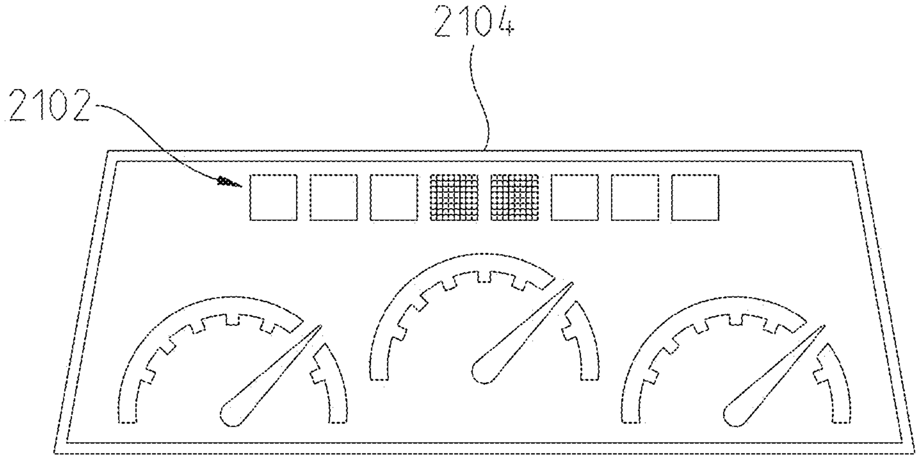
FIG. 22A illustrates an example configuration of one or more indicators of the vehicle of FIG. 21, according to some aspects described herein.

FIG. 22A illustrates a first configuration of the one or more indicators 2102. In the first configuration, the vehicle 2100 has a roll angle of zero degrees (e.g., flat driving). Therefore, the one or more indicators 2102 in FIG. 22A correspond to a roll angle of zero degrees.

Figure 22B:
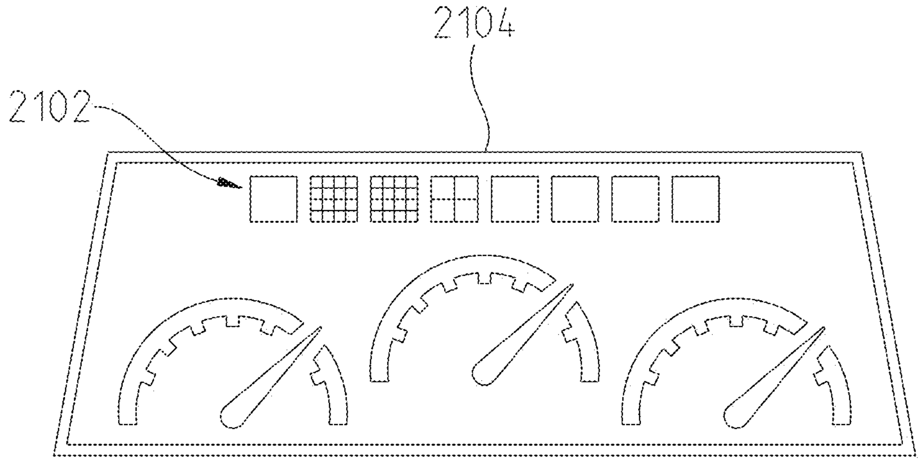
FIG. 22B illustrates an example configuration of one or more indicators of the vehicle of FIG. 21, according to some aspects described herein.

FIG. 22B illustrates a second configuration of the one or more indicators 2102. In the second configuration, the vehicle 2100 has a roll angle that is greater than the roll angle corresponding to the first configuration. Therefore, the one or more indicators 2102 in FIG. 22B correspond to a roll angle that is greater than the roll angle that corresponds to the first configuration of FIG. 22A.

Figure 22C:
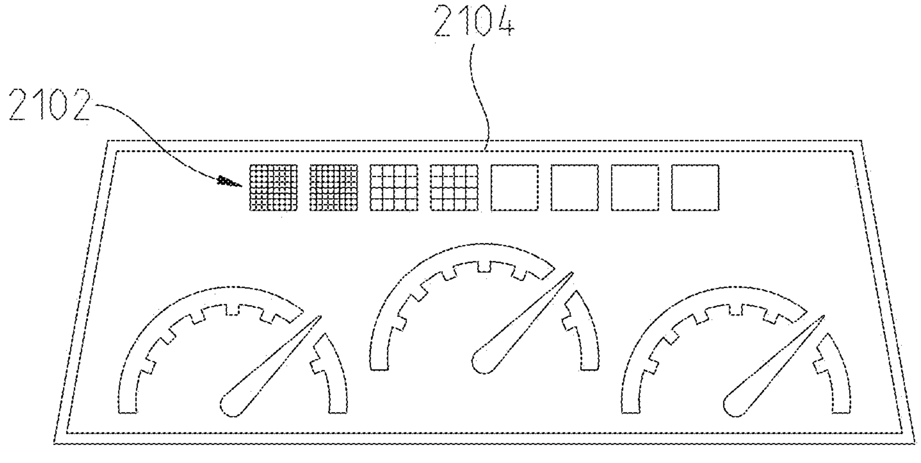
FIG. 22C illustrates an example configuration of one or more indicators of the vehicle of FIG. 21, according to some aspects described herein.

FIG. 22C illustrates a third configuration of the one or more indicators 2102. In the third configuration, the vehicle 2100 has a roll angle that is greater than the roll angle corresponding to the first and second configurations. Therefore, the one or more indicators 2102 in FIG. 22C correspond to a roll angle that is greater than the roll angle that corresponds to the first configuration of FIG. 22A and greater than the roll angle that corresponds to the second configuration of FIG. 22B.

While FIGS. 22A-22C are discussed with respect to roll angles specifically, it should be recognized that aspects provided herein may be similarly applied to variations in other types of kinematics, such as pitch angles, yaw angles, accelerations, or other types of kinematics that may be recognized by those of ordinary skill in the art.

Figure 23:
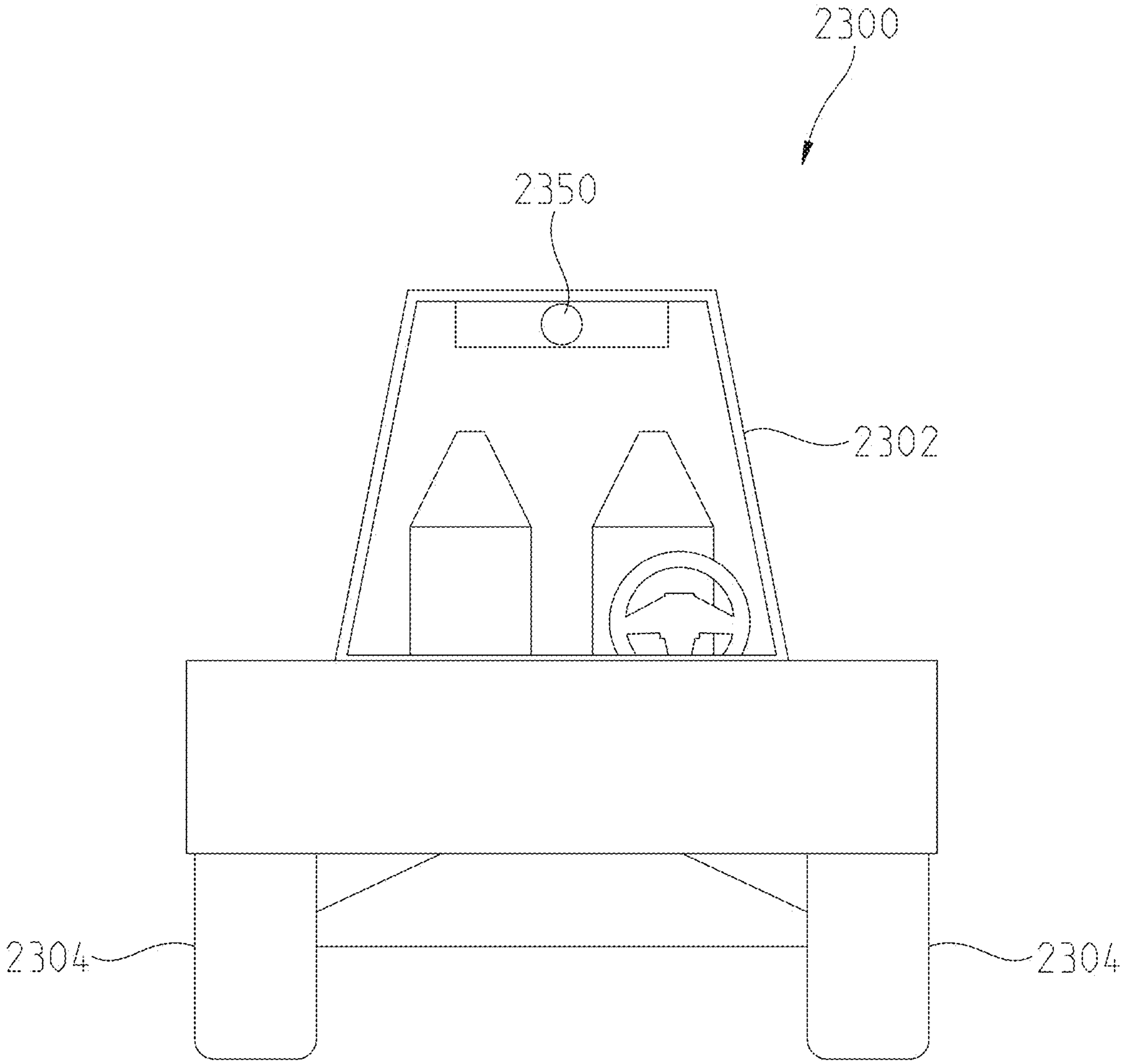
FIG. 23 illustrates an example vehicle, according to some aspects described herein.

FIG. 23 illustrates an example vehicle 2300 according to some aspects described herein. The vehicle 2300 may be similar to the vehicle 200 described earlier herein with respect to FIG. 2 and/or the vehicle 1200 described earlier herein with respect to FIGS. 12A-13B.

The vehicle 2300 includes a frame 2302 and a plurality of ground engaging members 2304 coupled to the frame 2302. The frame 2302 may be similar to the frame 202 and/or the frame 1202 described earlier herein. The vehicle 2300 further includes an image sensor 2350. The image sensor 2350 may be coupled to the frame 2302 and/or another component of the vehicle 2300. The vehicle 2300 further includes one or more kinematic sensors (not shown).

The vehicle 2300 further includes a controller (e.g., computing device 102 of FIG. 1). The controller is in communication with the image sensor 2350 and the one or more kinematic sensors. For example, the controller may be in wireless communication with the image sensor 2350 and the one or more kinematics sensors. Additionally, or alternatively, the controller may be in wired connection with the image sensor 2350 and the one or more kinematic sensors.

In some examples, the image sensor 2350 is a camera, such as a still image camera or a video camera. In some examples, the image sensor 2350 is a wide-angle video camera. The image sensor 2350 may be positioned to receive image data corresponding to one of a front of the vehicle 2300 or a rear of the vehicle 2300. For example, the image sensor 2350 may be positioned to capture image data corresponding to what is in front of the vehicle 2300, such as while the vehicle 2300 is moving. Additionally, or alternatively, the image sensor 2350 may be positioned to capture image data corresponding to what is behind the vehicle 2300, such as while the vehicle 2300 is moving.

In some examples, the frame 2302 defines a cabin that is sized and shaped to generally surround one or more occupants of the vehicle 2300. In some examples, the image sensor 2350 is positioned to receive image data that corresponds to the cabin. Accordingly, the image sensor 2350 may be positioned to capture video and/or images of the occupants of the vehicle 2300, with their permission.

In some examples, the kinematic sensors include one or more from the group of an angular velocity sensor, an angular acceleration sensor, an acceleration sensor, a velocity sensor, a pitch angle sensor, and a roll angle sensor. Additional and/or alternative types of kinematics sensors that may be used to measure kinematics of a vehicle, such as vehicle 2300, should be recognized by those of ordinary skill in the art.

Figure 24:
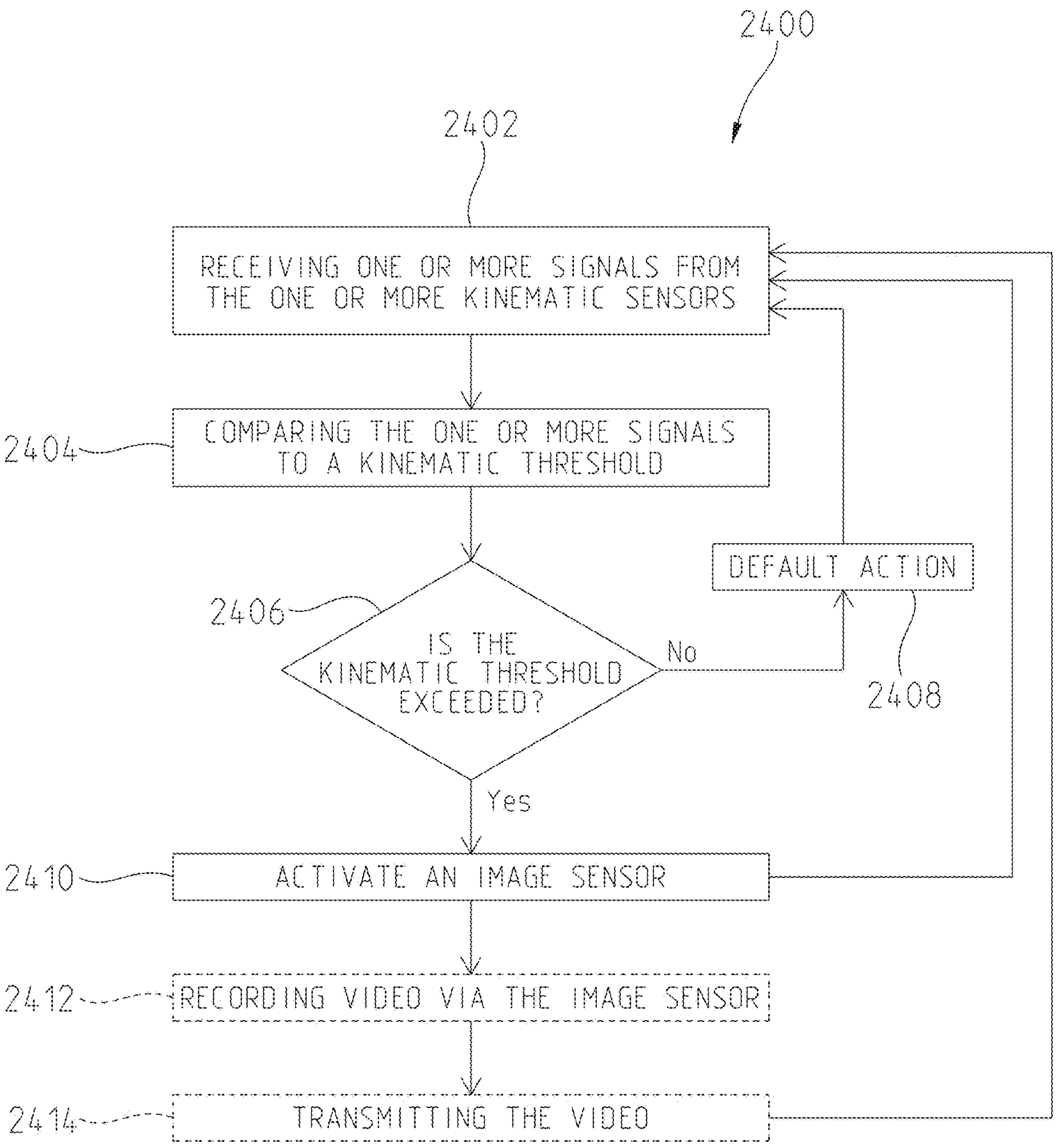
FIG. 24 illustrates an example method for recording events involving a vehicle, according to some aspects described herein.

FIG. 24 illustrates an example method according to some aspects described herein. The example method 2400 may be a method for recording events involving a vehicle, such as vehicle 2300 described above with respect to FIG. 23. In examples, aspects of method 2400 are performed by a device, such as controller 322, computing device 102, and/or server 102, discussed earlier herein with respect to FIGS. 1 and 3.

Method 2400 begins at operation 2402, wherein one or more signals are received from one or more kinematic sensors. In some examples, the kinematic sensors include one or more from the group of an angular velocity sensor, an angular acceleration sensor, an acceleration sensor, a velocity sensor, a pitch angle sensor, and a roll angle sensor. Additional and/or alternative types of kinematics sensors that may be used to measure kinematics of a vehicle, such as vehicle 2300, should be recognized by those of ordinary skill in the art. The one or more signals may be received by the controller of the vehicle.

At operation 2404, the one or more signals are compared to a kinematic threshold. In some examples, the kinematic threshold corresponds to one or more from the group of an angular velocity, an angular acceleration, an acceleration, a velocity, a pitch angle, and a roll angle of the vehicle. Additional and/or alternative types of kinematic threshold may be recognized by those of ordinary skill in the art.

At operation 2406, it is determined if the kinematic threshold is exceeded (e.g., in a positive direction, or a negative direction, such as by increasing above the kinematic threshold, or decreasing below the kinematic threshold). At operation 2406, it may also be determined whether a vehicle event has occurred, based on the one or more signals. For example, if the kinematic threshold is exceeded, then it may be determined that the vehicle event has occurred. However, if the kinematic threshold has not been exceeded, then it may be determined that the vehicle event has not occurred. In some examples, the kinematic threshold may correspond to a single type of kinematic threshold (e.g., solely acceleration, solely velocity, etc.). In some examples, the kinematic threshold may correspond to a plurality of kinematic values (e.g., a function in which two or more types of kinematic values are weighted together). For example, the kinematic threshold may correspond to a first weighted amount of an acceleration value and a second weighted amount of an angular velocity value. Additional and/or alternative combinations of kinematic values will be recognized by those of ordinary skill in the art, at least in light of teachings provided herein.

If the kinematic threshold is not exceeded, as indicated by "NO" in FIG. 24, method 2400 proceeds to operation 2408, where a default action is performed. For example, the one or more signals may include a pre-configured action that is performed at operation 2408. Additionally, or alternatively, the default action may include storing the one or more signals and/or indications thereof. In some examples, method 2400 may comprise determining whether the one or more signals and/or kinematic thresholds have an associated default action, such that, in some instances, no action may be performed as a result of comparing the one or more signals to a kinematic threshold. Method 2400 may terminate at operation 2408. Alternatively, method 2400 may return to operation 2402 to provide an iterative loop of receiving one or more signals from the one or more kinematic sensors, comparing the one or more signals (or derivatives thereof) to a kinematic threshold, and determining whether or not a vehicle event has occurred (e.g., by determining if the kinematic threshold is exceeded).

However, if it is determined that the kinematic tolerance is exceeded, as indicated by "YES" in FIG. 24, method 2400 advances to operation 2410. At operation 2410, an image sensor (e.g., image sensor 2350) is activated. The activation may include turning on the image sensor, or initiating certain functionality (e.g., capture functionality, record functionality, etc.) of the image sensor). The image sensor may be a camera, such as a camera that captures still images and/or videos. In some examples, the image sensor is a wide-angle video camera.

In some examples, in response to activating the image sensor, at operation 2412, video is recorded via the image sensor. For example, when a vehicle event occurs (e.g., an event where the vehicle is subject to kinematics that exceed a given threshold), then the front of the vehicle, the rear of the vehicle, and/or a cabin of the vehicle may be recorded. Some advantageous of such a recording may include the ability for occupants of the vehicle to reminisce about the experience that they had in the vehicle, such as when the vehicle event occurred.

In some examples, at operation 2414, the recorded video is transmitted. For example, the recorded video may be stored locally on the vehicle, and then transmitted to a server and/or computing device (e.g., server 104 and/or computing device 102) that is remote from the vehicle. In some examples, the recorded video may be transmitted to be accessed by one of the occupants of the vehicle and/or by someone who is granted permission to access the recorded video by one of the occupants of the vehicle. Additionally, or alternatively, in some examples, the recorded video may be stored (e.g., in one or more memories local to the vehicle and/or in one or more memories remote from the vehicle).

Method 2400 may terminate at operation 2410, or 2412, or 2414. Alternatively, method 2400 may return to operation 2402 (or any other operation from method 2400) to provide an iterative loop, such as of determining that a vehicle event has occurred (e.g., by determining that a kinematic threshold of a vehicle has been exceeded) and activating an image sensor of the vehicle.

Figure 25:
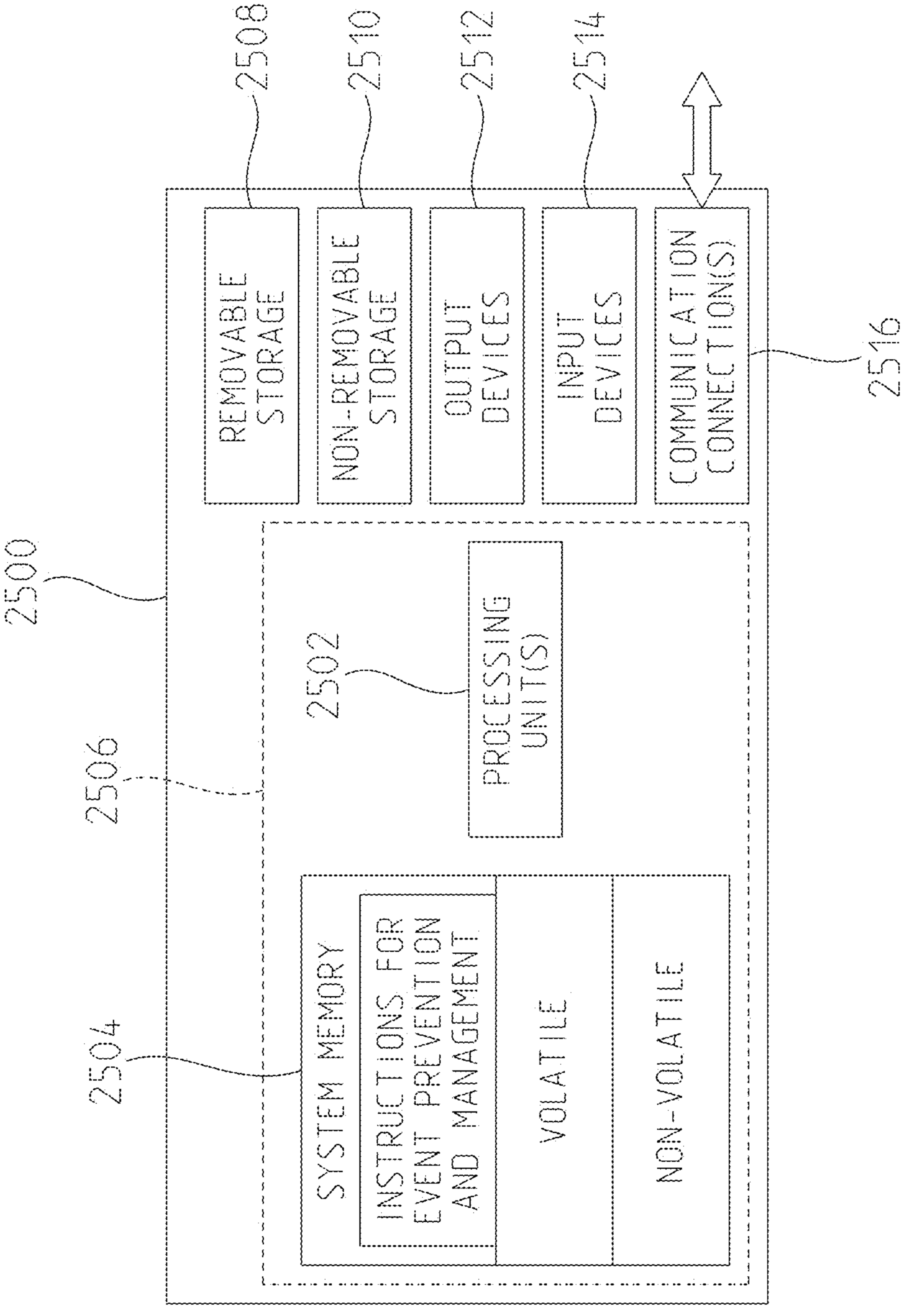
FIG. 25 illustrates a block diagram illustrating example physical components of a computing device with which aspects of the disclosure may be practiced.

FIG. 25 illustrates a simplified block diagram of a device with which aspects of the present disclosure may be practiced in accordance with aspects of the present disclosure. The device may be a mobile computing device, for example. One or more of the present embodiments may be implemented in an operating environment 2500. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 2500 typically includes at least one processing unit 2502 and memory 2504. Depending on the exact configuration and type of computing device, memory 2504 (e.g., instructions for one or more aspects disclosed herein, such as one or more aspects of methods/processes disclosed herein) may be volatile (such as RAM), non-volatile (such as ROM, flash memory, etc.), or some combination of the two. This most basic configuration is illustrated in FIG. 25 by dashed line 2506. Further, the operating environment 2500 may also include storage devices (removable, 2508, and/or non-removable, 2510) including, but not limited to, magnetic or optical disks or tape. Similarly, the operating environment 2500 may also have input device(s) 2514 such as remote controller, keyboard, mouse, pen, voice input, on-board sensors, etc. and/or output device(s) 2512 such as a display, speakers, printer, motors, etc. Also included in the environment may be one or more communication connections 2516, such as LAN, WAN, a near-field communications network, a cellular broadband network, point to point, etc.

Operating environment 2500 typically includes at least some form of computer readable media. Computer readable media can be any available media that can be accessed by the at least one processing unit 2502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 2500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The following clauses illustrate example subject matter described herein.

Clause 1. A seat for a vehicle, wherein the seat comprises: a backrest; a headrest; and one or more airbags stored within at least one of the backrest or the headrest, wherein the one or more airbags include: one or more arm wings, which, when deployed, are sized and shaped to encapsulate at least a portion of one or more arms of an occupant of the seat.

Clause 2. The seat of any of the clauses herein, wherein the one or more arms wings are generally conical, when deployed.

Clause 3. The seat of any of the clauses herein, wherein the backrest and the headrest include respective frames, and wherein the one or more airbags are stored within at least one of the frames of the backrest or the headrest.

Clause 4. The seat of any of the clauses herein, further comprising: a helmet airbag, which, when deployed, is sized and shaped to encapsulate a head of an occupant of the seat.

Clause 5. The seat of any of the clauses herein, wherein the helmet airbag is generally spherical, when deployed.

Clause 6. A method for deploying the one or more airbags of any of the clauses herein, the method comprising: receiving a setting for a kinematic tolerance of the vehicle; receiving an indication corresponding to one or more kinematics of the vehicle; comparing the indication to the kinematic tolerance; and deploying the one or more airbags, in response to determining that the kinematic tolerance is exceeded.

Clause 7. The method of any of the clauses herein, wherein the kinematic tolerance comprises an acceleration tolerance, and wherein the one or more kinematics comprises acceleration.

Clause 8. The method of any of the clauses herein, wherein the kinematic tolerance comprises an angular velocity tolerance, and wherein the one or more kinematics comprises angular velocity.

Clause 9. A vehicle, comprising: an operator compartment with a footwell; a throttle pedal assembly coupled to the footwell, the throttle pedal assembly comprising: a pedal pad; an instrumentation section; and a pedal arm extending between the pedal pad and the instrumentation section, wherein the instrumentation section comprises a leaf spring and one or more strain gages disposed thereon.

Clause 10. The vehicle of any of the clauses herein, wherein the instrumentation section is encapsulated in an elastomeric material.

Clause 11. The vehicle of any of the clauses herein, wherein the elastomeric material comprises at least one of silicone or epoxy.

Clause 12. The vehicle of any of the clauses herein, wherein the leaf spring comprises steel.

Clause 13. The vehicle of any of the clauses herein, wherein the vehicle comprises a controller, and wherein the one or more strain gages are in communication with the controller.

Clause 14. The vehicle of any of the clauses herein, wherein the one or more strain gages are in wired communication with the controller.

Clause 15. The vehicle of any of the clauses herein, wherein the one or more strain gages are in wireless communication with the controller.

Clause 16. A method of controlling vehicle throttle using the pedal assembly of any of the clauses herein, the method comprising: receiving a signal corresponding to deflection of the pedal arm, from the one or more strain gages; calculating a desired amount of throttle for the vehicle based on the signal; and causing the vehicle to be throttled the desired amount.

Clause 17. A vehicle comprising: a seatbelt harness, the seatbelt harness comprising: a first harness side comprising an upper strap, a lower strap, and a connector; and a second harness side comprising an upper strap, a lower strap, and a connector, the connector of the second harness side being configured to engage with the connector of the first harness side to fasten the seatbelt harness, wherein at least one of the upper straps comprises a handhold strap coupled thereto.

Clause 18. The vehicle of any of the clauses herein, wherein the upper strap of the first harness side and the upper strap of the second harness side each comprise a handhold strap coupled thereto.

Clause 19. The vehicle of any of the clauses herein, wherein the handhold strap is coupled to the at least one of the upper straps via sewing.

Clause 20. The vehicle of any of the clauses herein, wherein the handhold strap defines a channel with the at least one of the upper straps, and wherein the channel is sized and shaped to receive a hand of a user of the seatbelt harness.

Clause 21. The vehicle of any of the clauses herein, wherein the at least one of the upper straps comprises a stiffening member at where the handhold strap is coupled thereto.

Clause 22. The vehicle of any of the clauses herein, wherein the handhold straps extend from one of a top of the at least one of the upper straps or a side of the at least one of the upper straps.

Clause 23. A vehicle comprising: a seatbelt harness, the seatbelt harness comprising: a first harness side comprising an upper strap, a lower strap, and a connector; and a second harness side comprising an upper strap, a lower strap, and a connector, the connector of the second harness side being configured to engage with the connector of the first harness side to fasten the seatbelt harness, and wherein at least one of the upper straps comprises a latch mount coupled thereto via a tether extending between the latch mount and the at least one of the upper straps.

Clause 24. The vehicle of any of the clauses herein, wherein the latch mount is a magnetic-mechanical latch mount.

Clause 25. The vehicle of any of the clauses herein, wherein the latch mount is sized and shaped to receive a corresponding latch attachment of a cuff adapted to be worn by an occupant of the vehicle.

Clause 26. The vehicle of any of the clauses herein, wherein the latch mount is configured to lock the latch attachment thereto when the latch attachment is pressed against the latch mount.

Clause 27. The vehicle of any of the clauses herein, wherein the latch mount is configured to unlock the latch attachment therefrom when the latch attachment is again pressed against the latch mount.

Clause 28. The vehicle of any of the clauses herein, wherein the cuff comprises a key for the vehicle.

Clause 29. The vehicle of any of the clauses herein, wherein the cuff comprises a watch.

Clause 30. A vehicle comprising: a seatbelt harness, the seatbelt harness comprising: a first harness side comprising an upper strap, a lower strap, and a connector; and a second harness side comprising an upper strap, a lower strap, and a connector, the connector of the second harness side being configured to engage with the connector of the first harness side to fasten the seatbelt harness, and a shoulder strap coupled to at least one of the upper straps.

Clause 31. The vehicle of any of the clauses herein, wherein the shoulder straps extends from the at least one of the upper straps at an acute angle with respect thereto.

Clause 32. The vehicle of any of the clauses herein, wherein the vehicle further comprises a frame, and wherein the shoulder strap is further coupled to the frame.

Clause 33. The vehicle of any of the clauses herein, wherein the vehicle further comprises a seat, and wherein the should strap is further coupled to the seat.

Clause 34. The vehicle of any of the clauses herein, wherein a web extends between the shoulder strap and the at least one of the upper straps.

Clause 35. The vehicle of any of the clauses herein, wherein the shoulder strap is sewn onto the at least one of the upper straps.

Clause 36. A vehicle comprising: a plurality of ground engaging members; a frame coupled to the plurality of ground engaging members; a rotating arm coupled to the frame, above the plurality of ground engaging members; and a net attached to the underside of the rotating arm.

Clause 37. The vehicle of any of the clauses herein, wherein the frame comprises an upper frame and a lower frame, and wherein the rotating arm is coupled to the upper frame.

Clause 38. The vehicle of any of the clauses herein, wherein the rotating arm comprises a first end and a second end which are laterally opposed from one another, and wherein the first end of the rotating arm couples to the frame at a pivot mount.

Clause 39. The vehicle of any of the clauses herein, wherein the vehicle further comprises a seat comprising a seat back and a seat bottom, and wherein: a front of the seat bottom defines a vertical plane, a top of the seat bottom defines a horizontal plane, and the pivot mount is disposed above the horizontal plane and rearward of the vertical plane.

Clause 40. The vehicle of any of the clauses herein, wherein the second end of the rotating arm comprises a striker, and wherein the second end is rotatable between a first position and a second position.

Clause 41. The vehicle of any of the clauses herein, wherein the first position is a raised position, and wherein in the raised position, the striker engages with a latch coupled to the frame, thereby raising the net across at least a portion of the frame.

Clause 42. The vehicle of any of the clauses herein, wherein the vehicle further comprises a sensor programmed to detect whether the rotating arm is in the first position or the second position.

Clause 43. The vehicle of any of the clauses herein, wherein the vehicle further comprises a controller in communication with the sensor, and wherein the controller is programmed to adapt one or more settings of the vehicle, based on the detection of the sensor.

Clause 44. The vehicle of any of the clauses herein, wherein the second position is a down position, wherein the frame comprises a brake, and wherein in the down position, the striker engages the brake, thereby securing the net in a down position.

Clause 45. The vehicle of any of the clauses herein, wherein the brake comprises at least one of a magnet or a door hold.

Clause 46. A vehicle comprising: a plurality of ground engaging members; a frame coupled to the plurality of ground engaging members; a webbing coupled to the frame;

and a retractor for the webbing, coupled to the frame, the retractor comprising: a housing; and a spool for the webbing, disposed within the housing.

Clause 47. The vehicle of any of the clauses herein, wherein the webbing comprises an upper webbing rigidly fixed to the frame and a lower webbing fixedly coupled to the retractor.

Clause 48. The vehicle of any of the clauses herein, wherein the lower webbing is coupled to the frame via one or more connectors, when in a stored position, and wherein the retractor is configured to break the one or more connectors, when activated, thereby expanding the webbing, across at least a portion of the frame, to a deployed position.

Clause 49. The vehicle of any of the clauses herein, wherein the retractor further comprises a torsional spring that is attached to the spool, and wherein the torsional spring causes the spool to rotate, in response to the retractor being activated.

Clause 50. The vehicle of any of the clauses herein, wherein the vehicle further comprises a door, and wherein the webbing extends substantially parallel to the door, in response to the retractor being activated.

Clause 51. The vehicle of any of the clauses herein, wherein the vehicle further comprises a door, and wherein the webbing extends substantially orthogonal to the door, in response to the retractor being activated.

Clause 52. The vehicle of any of the clauses herein, wherein the vehicle further comprises a controller in communication with the retractor, and wherein the retractor is activated in response to one or more calculations by the controller, the one or more calculations being based on one or more selected from the group of: an acceleration of the vehicle, roll angle of the vehicle, and roll angle rate of change of the vehicle.

Clause 53. A method of deploying a webbing of a vehicle, the vehicle comprising a frame and a retractor, and the webbing comprising an upper webbing fixedly coupled to the frame and a lower webbing fixedly coupled to the retractor, the method comprising: receiving a signal corresponding to a kinematic measurement of the vehicle; activating the retractor, in response to receiving the signal; and retracting the lower webbing of the webbing, via the retractor, thereby expanding the webbing across at least a portion of the frame of the vehicle.

Clause 54. The method of any of the clauses herein, wherein the retractor comprises a housing and a spool, disposed within the housing, about which the lower webbing is retracted.

Clause 55. The method of any of the clauses herein, wherein the retractor comprises a torsional spring that is attached to the spool, wherein the torsional spring causes the spool to rotate, in response to the activating the retractor.

Clause 56. The method of any of the clauses herein, wherein the signal is received from a controller of the vehicle, and wherein the kinematic measurement is one or more selected from the group of: an acceleration of the vehicle, roll angle of the vehicle, and roll angle rate of change of the vehicle.

Clause 57. A vehicle comprising: a frame; a plurality of ground engaging members coupled to the frame; one or more roll angle sensors; one or more indicators; and a controller in communication with the one or more roll angle sensors, the controller comprising a processor and memory storing instructions that, when executed by the processor, cause the controller to perform a set of operations comprising: receiving a signal from the one or more roll angle sensors indicative of a roll angle of the vehicle; and adapting the one or more indicators to provide a notification corresponding to the roll angle, based on the signal.

Clause 58. The vehicle of any of the clauses herein, wherein the one or more indicators are light emitting diodes (LEDs).

Clause 59. The vehicle of any of the clauses herein, wherein the vehicle further comprises at least one of a dashboard and a steering wheel, and wherein the LEDs are disposed on one or more of the at least one of a dashboard and a steering wheel.

Clause 60. The vehicle of any of the clauses herein, wherein the vehicle comprises a display, and wherein the one or more indicators are generated by the display.

Clause 61. The vehicle of any of the clauses herein, wherein the signal is a first signal, the roll angle is a first roll angle, and notification is a first notification, and wherein the set of operations further comprises: receiving a second signal from the one or more roll angle sensors indicative of a second roll angle of the vehicle, the second roll angle being different than the first roll angle; and adapting the one or more indicators to provide a second notification corresponding to the second roll angle, based on the second signal, the second notification being different than the first notification.

Clause 62. The vehicle of any of the clauses herein, wherein the set of operations further comprises: receiving a third signal from the one or more roll angle sensors indicative of a third roll angle of the vehicle, the third roll angle being different than the first and second roll angles; and adapting the one or more indicators to provide a third notification corresponding to the third roll angle, based on the third signal, the third notification being different than the first and second notifications.

Clause 63. The vehicle of any of the clauses herein, wherein the set of operations further comprises, prior to adapting the one or more indicators, comparing the signal to one or more predetermined threshold of roll angles for the vehicle, and adapting the one or more indicator to provide a notification correspond to the roll angle, based on the comparison.

Clause 64. A vehicle comprising: a frame; a plurality of ground engaging members coupled to the frame; an image sensor; one or more kinematic sensors; and a controller in communication with the image sensor and the one or more kinematic sensors, the controller comprising a processor and memory storing instructions that, when executed by the processor, cause the controller to perform a set of operations comprising: receiving one or more signals from the one or more kinematic sensors; determining that a vehicle event has occurred based on the one or more signals; and activating the image sensor.

Clause 65. The vehicle of any of the clauses herein, wherein the image sensor is a wide-angle video camera.

Clause 66. The vehicle of any of the clauses herein, wherein the image sensor is positioned to receive image data corresponding to one of a front of the vehicle or a rear of the vehicle.

Clause 67. The vehicle of any of the clauses herein, wherein the frame defines a cabin sized and shaped to house one or more occupants of the vehicle, and wherein the image sensor is positioned to receive image data corresponding to the cabin.

Clause 68. The vehicle of any of the clauses herein, wherein the determining comprises comparing the one or more signals to a kinematic threshold.

Clause 69. The vehicle of any of the clauses herein, wherein the kinematic sensors comprise one or more from the group of an angular velocity sensor, an angular acceleration sensor, an acceleration sensor, a velocity sensor, a pitch angle sensor, and a roll angle sensor.

Clause 70. The vehicle of any of the clauses herein, wherein the kinematic threshold corresponds to one or more from the group of an angular velocity, an angular acceleration, an acceleration, a velocity, a pitch angle, and a roll angle of the vehicle.

Clause 71. The vehicle of any of the clauses herein wherein the set of operations further comprises: in response to activating the image sensor, recording video via the image sensor.

Clause 72. The vehicle of any of the clauses herein, wherein the set of operations further comprises: transmitting the video.

Clause 73. A method of deploying one or more occupant retention devices, the method comprising: receiving a setting for a kinematic tolerance of a vehicle; receiving an indication corresponding to one or more kinematics of the vehicle; comparing the indication to the kinematic tolerance; and deploying the one or more occupant retention devices, in response to determining that the kinematic tolerance is exceeded.

Clause 74. The method of any of the clauses herein, wherein the one or more occupant retention devices comprise at least one selected from the group of: an airbag, a webbing, and a seatbelt.

Clause 75. The method of any of the clauses herein, wherein the kinematic tolerance comprises a roll angle tolerance, and wherein the one or more kinematics comprise a roll angle value.

Clause 76. The method of any of the clauses herein, wherein the kinematic tolerance comprises a pitch angle tolerance, and wherein the one or more kinematics comprise a pitch angle value.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A seat for a vehicle, wherein the seat comprises:
- a backrest;
- a headrest; and
- one or more airbags stored within at least one of the backrest or the headrest, wherein the one or more airbags include:
  - one or more arm wings, which, when deployed:
    - are configured to encapsulate at least a portion of one or more arms of an occupant of the seat; and
    - are conical with a minor diameter of a cone proximate a shoulder of the occupant of the seat and a major diameter of the cone descended relative to the shoulder of the occupant.

2. The seat of claim 1, wherein the backrest and the headrest include respective frames, and wherein the one or more airbags are stored within at least one of the frames of the backrest or the headrest.

3. The seat of claim 1, further comprising: a helmet airbag, which, when deployed, is sized and shaped to encapsulate a head of an occupant of the seat.

4. The seat of claim 3, wherein the helmet airbag is generally spherical, when deployed.

5. A vehicle comprising the seat of claim 1, wherein the vehicle further comprises:
- an operator compartment with a footwell;
- a throttle pedal assembly coupled to the footwell, the throttle pedal assembly comprising:
- a pedal pad;
- an instrumentation section; and
- a pedal arm extending between the pedal pad and the instrumentation section,
- wherein the instrumentation section comprises a leaf spring and one or more strain gages disposed thereon.

6. A vehicle comprising the seat of claim 1, wherein the vehicle further comprises:
- a seatbelt harness, the seatbelt harness comprising:
- a first harness side comprising an upper strap, a lower strap, and a connector; and
- a second harness side comprising an upper strap, a lower strap, and a connector, the connector of the second harness side being configured to engage with the connector of the first harness side to fasten the seatbelt harness.

7. The vehicle of claim 6, wherein at least one of the upper straps comprises a handhold strap coupled thereto.

8. The vehicle of claim 6, wherein at least one of the upper straps comprises a latch mount coupled thereto via a tether extending between the latch mount and the at least one of the upper straps.

9. The vehicle of claim 6, wherein the seatbelt harness further comprises a shoulder strap coupled to at least one of the upper straps.

10. A method for deploying one or more airbags, the method comprising:
- receiving a setting for a kinematic tolerance of a vehicle;
- receiving an indication corresponding to one or more kinematics of the vehicle;
- comparing the indication to the kinematic tolerance;
- deploying one or more airbags, in response to determining that the kinematic tolerance is exceeded; and
- wherein the one or more airbags include one or more arm wings, which, when deployed:
  - are configured to encapsulate at least a portion of one or more arms of an occupant of the vehicle; and
  - are configured to prevent the one or more arms of the occupant of the vehicle from going above an upper boundary of a vehicle door.

11. The method of claim 10, wherein the kinematic tolerance comprises an acceleration tolerance, and wherein the one or more kinematics comprises acceleration.

12. The method of claim 10, wherein the kinematic tolerance comprises an angular velocity tolerance, and wherein the one or more kinematics comprises angular velocity.

13. The method of claim 10, wherein the one or more arms wings are generally conical, when deployed.

14. The method of claim 10, wherein, prior to being deployed, the one or more airbags are stored within at least one of a backrest frame or a headrest frame.

15. The method of claim 10, wherein the one or more airbags further comprises a helmet airbag, which, when deployed, is sized and shaped to encapsulate a head of an occupant of the seat.

16. The method of claim 15, wherein the helmet airbag is generally spherical, when deployed.

17. A vehicle, the vehicle comprising:

a seat, the seat comprising:

a backrest;

a headrest; and one or more airbags stored within at least one of the backrest or the headrest, wherein the one or more airbags include:

a helmet airbag, which, when deployed, is configured to encapsulate a head of an occupant of the seat; and one or more arm wings, which, when deployed, are configured to encapsulate at least a portion of one or more arms of the occupant of the seat and prevent the one or more arms of the occupant from going above an upper boundary of a vehicle door.

18. The vehicle of claim 17, wherein the helmet airbag is generally spherical, when deployed.

19. The vehicle of claim 17, wherein the backrest and the headrest include respective frames, and wherein the one or more airbags are stored within at least one of the frames of the backrest or the headrest.

* * * * *